United States Patent
Wu et al.

(10) Patent No.: US 7,580,928 B2
(45) Date of Patent: *Aug. 25, 2009

(54) METHOD FOR CREATING FROM INDIVIDUAL REPORTS A CONSOLIDATED DATA SET WITH METADATA INCLUDING INFORMATION ABOUT THE LAST PRESENTATION FORMAT OF DATA WITHIN THE INDIVIDUAL REPORTS

(75) Inventors: Ju Wu, Coquitlam (CA); Siu Man Hsieh, Burnaby (CA)

(73) Assignee: Business Objects Software Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 11/166,039

(22) Filed: Jun. 24, 2005

(65) Prior Publication Data

US 2005/0289136 A1 Dec. 29, 2005

Related U.S. Application Data

(63) Continuation-in-part of application No. 10/328,744, filed on Dec. 23, 2002.

(51) Int. Cl.
    G06F 17/30 (2006.01)
    G06F 17/00 (2006.01)
(52) U.S. Cl. .......................................... 707/4; 707/100
(58) Field of Classification Search .................... 707/3, 707/4, 5, 10, 200, 201, 6, 100
    See application file for complete search history.

(56) References Cited

U.S. PATENT DOCUMENTS

| | | | |
|---|---|---|---|
| 5,212,788 A * | 5/1993 | Lomet et al. ................ 707/201 |
| 5,710,900 A | 1/1998 | Anand et al. |
| 5,787,416 A | 7/1998 | Tabb et al. |
| 5,899,988 A * | 5/1999 | Depledge et al. ............... 707/3 |
| 6,195,653 B1 * | 2/2001 | Bleizeffer et al. ............. 707/2 |
| 6,393,422 B1 | 5/2002 | Wone |
| 6,418,450 B2 * | 7/2002 | Daudenarde ............... 707/200 |
| 6,539,370 B1 | 3/2003 | Chang et al. |
| 6,549,906 B1 * | 4/2003 | Austin et al. ................. 707/10 |
| 6,604,110 B1 * | 8/2003 | Savage et al. .............. 707/102 |
| 6,643,635 B2 | 11/2003 | Nwabueze |
| 6,647,392 B1 | 11/2003 | Tagg |
| 6,775,675 B1 * | 8/2004 | Nwabueze et al. .......... 707/100 |
| 7,015,911 B2 * | 3/2006 | Shaughnessy et al. ....... 345/440 |
| 7,117,208 B2 * | 10/2006 | Tamayo et al. ................ 707/6 |

* cited by examiner

*Primary Examiner*—Uyen T. Le
(74) *Attorney, Agent, or Firm*—Cooley Godward Kronish LLP

(57) ABSTRACT

A computer-readable medium includes executable instructions to analyze a repository of individual reports to generate a consolidated data set, where the consolidated data set includes data from different individual reports. The consolidated data set is augmented with metadata. The consolidated data set and metadata are inserted within an electronic document.

15 Claims, 20 Drawing Sheets

FIG. 12

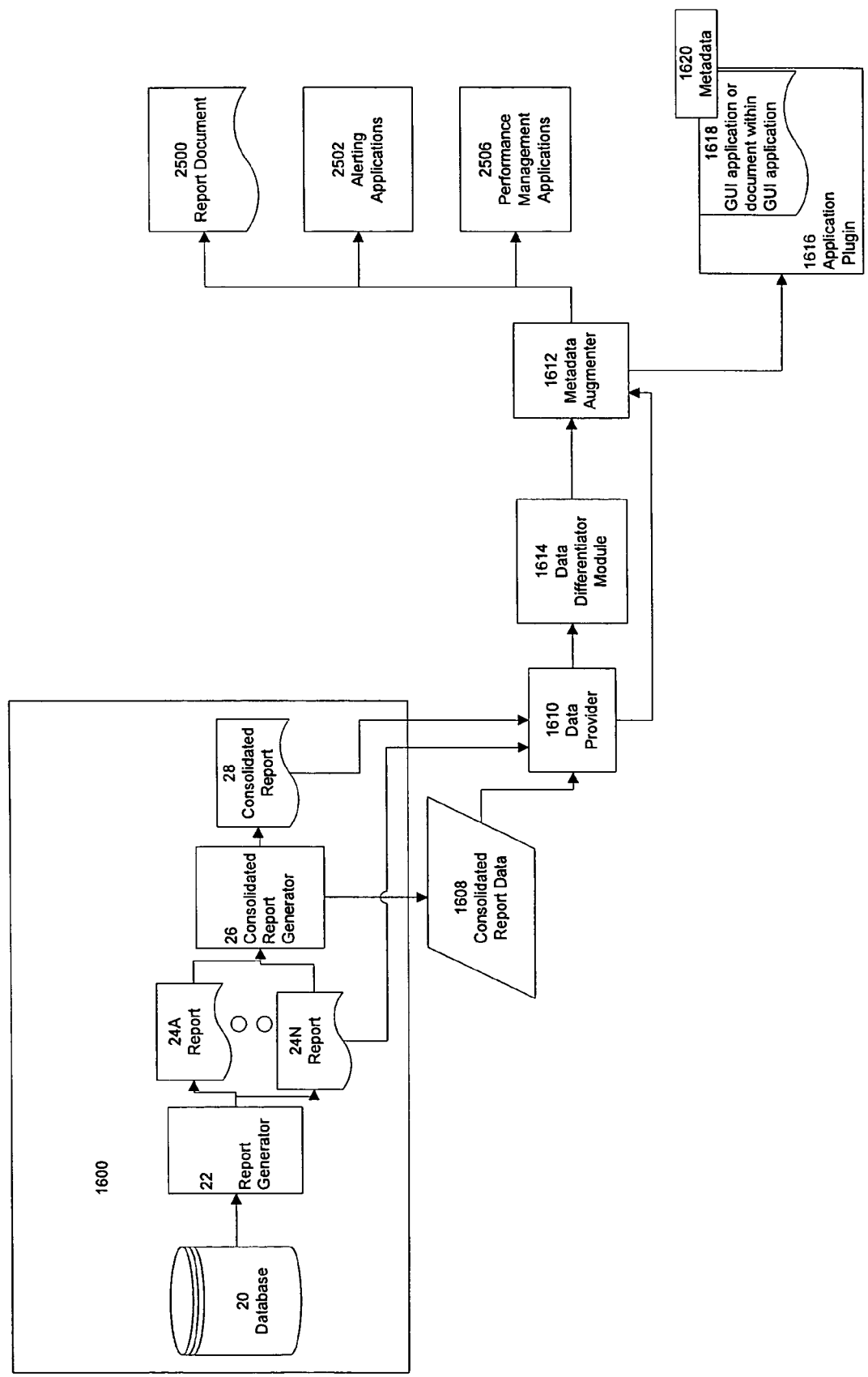

METHOD FOR CREATING FROM INDIVIDUAL REPORTS A CONSOLIDATED DATA SET WITH METADATA INCLUDING INFORMATION ABOUT THE LAST PRESENTATION FORMAT OF DATA WITHIN THE INDIVIDUAL REPORTS

CROSS REFERENCE TO RELATED APPLICATIONS

This application is a continuation-in-part of the pending application entitled "Apparatus and Method for Creating New Reports from Discrete Reports", U.S. Ser. No. 10/328,744, filed Dec. 23, 2002.

BRIEF DESCRIPTION OF THE INVENTION

This invention relates generally to the generation of reports. More particularly, this invention relates to techniques for generating consolidated data sets based upon existing reports.

BACKGROUND OF THE INVENTION

There are a number of commercially available products to create reports from data stored in a database. Business Objects Americas, Inc. of San Jose, Calif. sells a number of widely used report generation products, including Crystal Reports™, Crystal Analysis™, and Crystal Enterprise™. As used herein, the term report refers to information automatically retrieved (i.e., in response to computer executable instructions) from a data source (e.g., a database, a data warehouse, and the like), where the information is structured in accordance with a report schema that specifies the form in which the information should be presented. As discussed below, a consolidated data set refers to a combined subset of the information from multiple reports; typically, the subset of information maintains the structure specified by the report schema.

When using and sharing business intelligence report data it is often desirable to see not only a specific data value, but to understand this value within a larger data context. For example, trends in time often provide contextual guidance in evaluating the meaning of a data value. Likewise, a data value for one corporate department may be more significant when the user is provided with the same data value for other corporate departments.

Similarly, a calculated difference between the two corporate departments or for one corporate department at two different points in time can provide guidance in evaluating data. At times it may be useful for this calculated difference to also include additional calculations, such as corrections for different currency values or other accounting factors that may affect the interpretation of the data. This information about the trends and differences between data can be efficiently constructed by consolidated data sets based on existing reports.

At times it may also be desirable to provide this trend and difference data within a non-report document or application. A non-report is an electronic document that is constructed without the automatic retrieval (i.e., in response to computer executable instructions) of information from a data source. Examples of non-report electronic documents include typical business application documents, such as a word processor document, a spreadsheet document, a presentation document, and the like. In these documents, manual intervention is typically required to establish content and formatting. Presently, it is difficult to insert consolidated data sets created from discrete reports into another electronic document, such as a non-report document.

Reports can represent multiple instances, or snapshots, of data that facilitate constructing trend or differentiation data sets. By using reports as a data source, limitations associated with existing report generation tools are avoided. The creation of a new form of report or data set does not require the rebuilding of the database schema, which can be complex and time consuming. Additionally, when using reports as a data source, the report generation tools are not required to merge data directly from multiple databases although the source reports themselves may be based on multiple databases. This problem is especially acute in the case where the databases are from different vendors (e.g., Oracle®, IBM®, Microsoft®).

In view of the foregoing, it would be highly desirable to provide an improved technique for generating reports to overcome some of the limitations associated with existing report generation tools.

SUMMARY OF THE INVENTION

The invention includes a computer-readable medium with executable instructions to analyze a repository of individual reports to generate a consolidated data set, where the consolidated data set includes data from different individual reports. The consolidated data set is augmented with metadata. The consolidated data set and metadata are inserted within an electronic document.

The invention also includes a method of processing data. A repository of individual reports is created by processing data within a database. The repository of individual reports is analyzed to generate a consolidated data set, where the consolidated data set includes data from different individual reports. The consolidated data set is augmented with metadata. The consolidated data set and metadata are inserted within an electronic document.

BRIEF DESCRIPTION OF THE FIGURES

The invention is more fully appreciated in connection with the following detailed description taken in conjunction with the accompanying drawings, in which:

FIG. 12 illustrates the result of drilling through information within the report of FIG. 11 to obtain a detailed base report.

FIG. 25 illustrates a metadata augmenter acting as a data provider to a range of applications.

Like reference numerals refer to corresponding parts throughout the several views of the drawings.

DETAILED DESCRIPTION OF THE INVENTION

Figure 1:
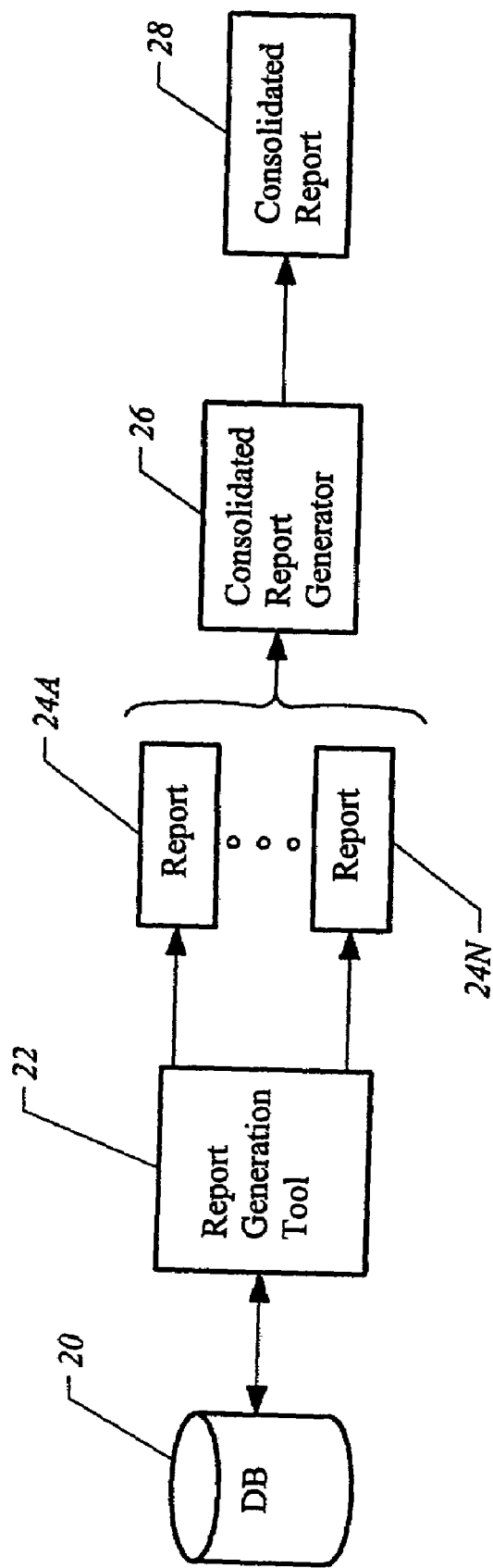
FIG. 1 illustrates the operation of consolidated report generation in accordance with an embodiment of the invention.

FIG. 1 illustrates the operation of consolidated report generation in accordance with an embodiment of the invention. In accordance with the prior art, a database 20 is accessed by a conventional report generation tool 22 to produce a set of reports 24A-24N. In the prior art, if a new report is to be created, the report generation tool 22 must be used to access the database 20 to create a new report.

In accordance with the invention, a consolidated report generator 26 is used to produce a consolidated report 28 based upon the information contained in the previously generated reports 24A-24N. In other words, the consolidated report generator 26 does not access the data in the database 20; rather, the consolidated report generator 26 uses the data in the reports 24A-24N as a data source to produce a new consolidated report 28.

Figure 2:
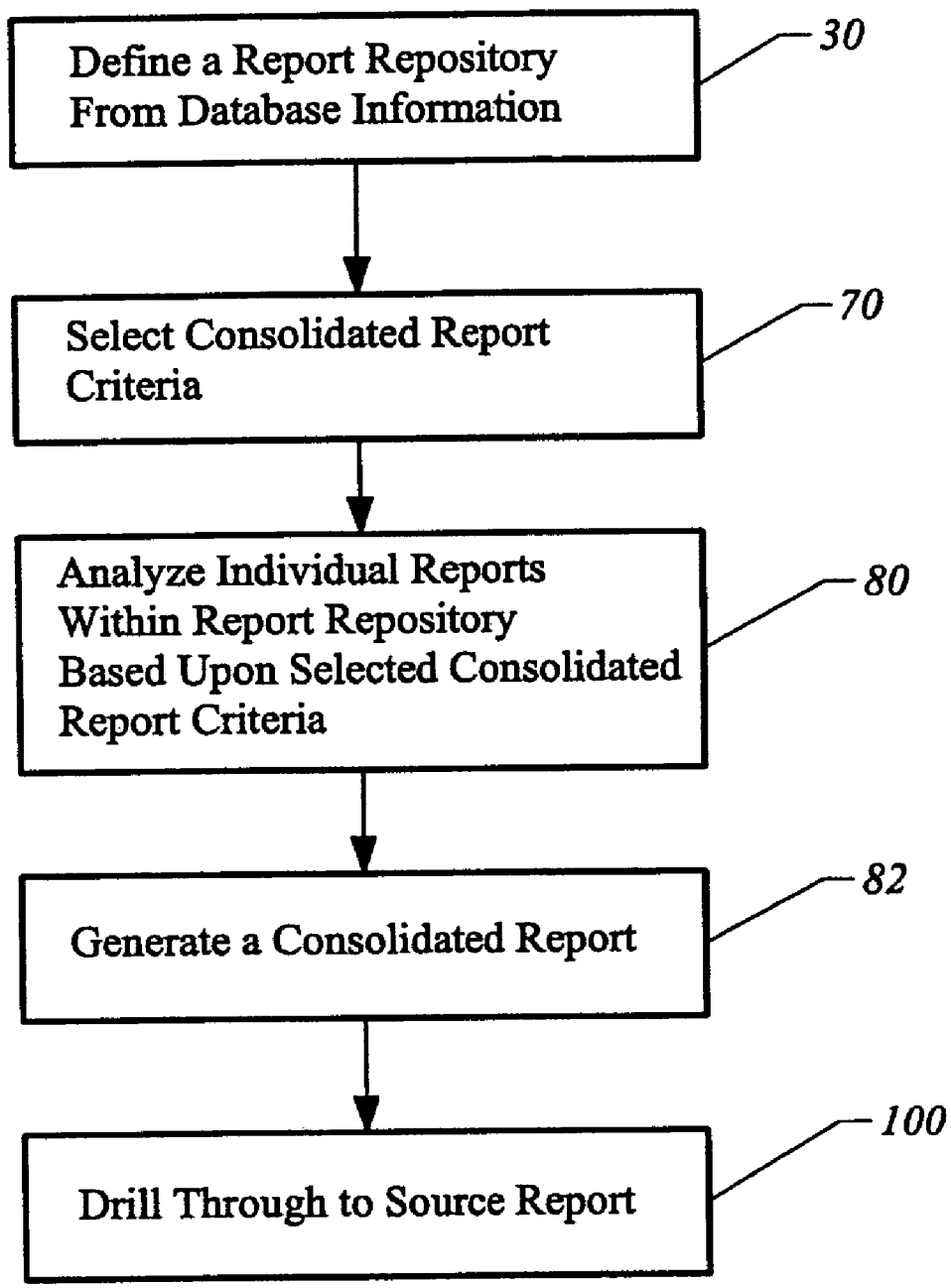
FIG. 2 illustrates processing operations performed in accordance with an embodiment of the invention.

FIG. 2 illustrates processing operations associated with an embodiment of the invention. Initially, a report repository of individual reports is created or defined from database information (block 30). A report repository is simply a collection of reports. The individual reports may be created with a conventional report generation tool, such as Crystal Reports™, Crystal Analysis™, or Crystal Enterprise™, sold by Business Objects Americas, Inc. of San Jose, Calif.

Figure 3:
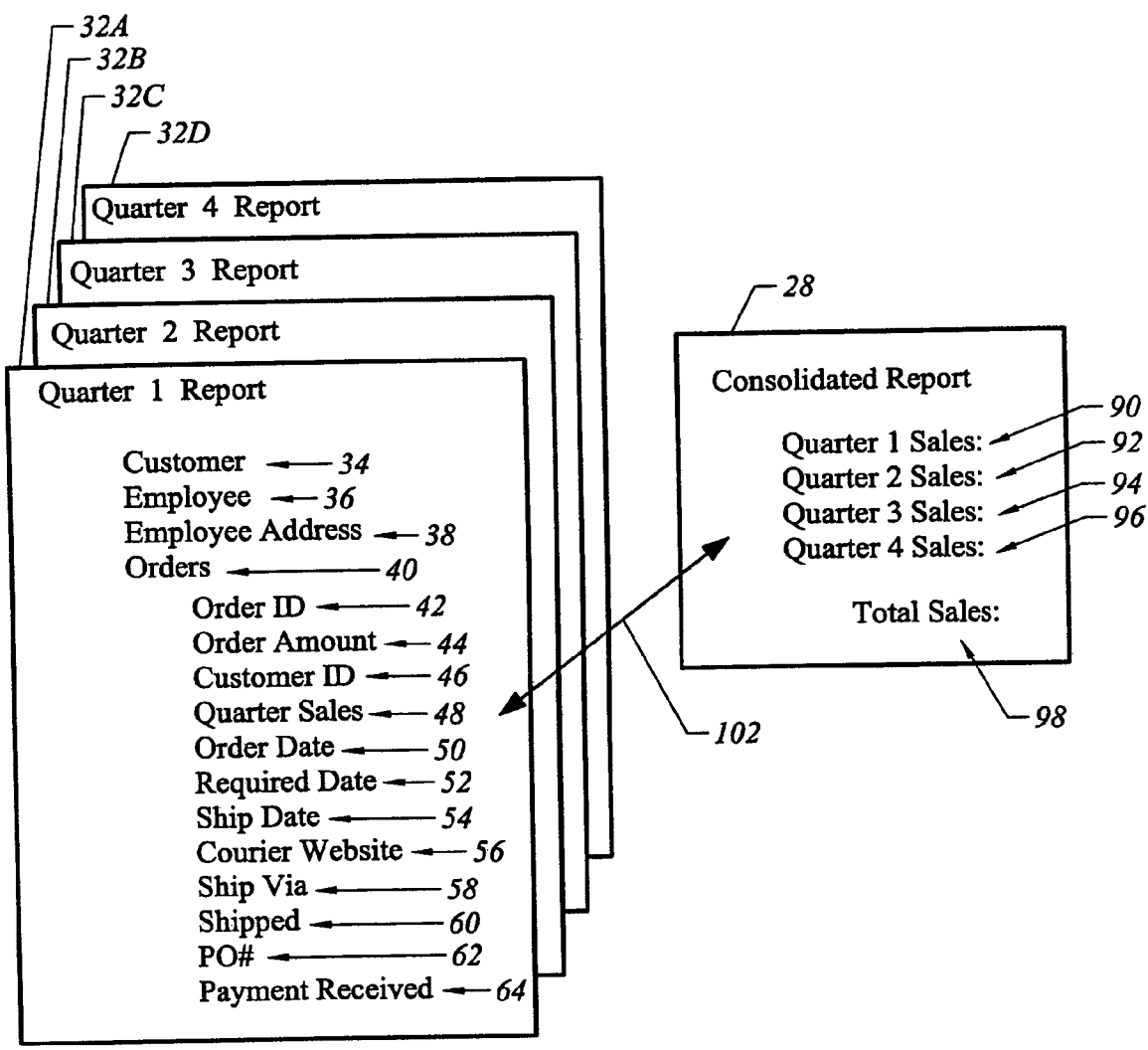
FIG. 3 is an example of portions of reports used to create a consolidated report in accordance with an embodiment of the invention.

By way of example, FIG. 3 illustrates four individual reports 32A-32D. Each individual report provides information for a quarter of a calendar year. Thus, there is a first quarter report 32A, a second quarter report 32B, a third quarter report 32C, and a fourth quarter report 32D. In this example, each report 32 has a customer field 34, an employee field 36, an employee address field 38, and an orders field 40, as shown in FIG. 3. The orders field 40 has a set of sub-fields, including an order ID field 42, an order amount field 44, a customer ID field 46, a quarter sales field 48, an order date field 50, a required date field 52, a ship date field 54, a courier website field 56, a ship via field 58, a shipped field 60, a Purchase Order number field 62, and a payment received field 64.

Figure 4:
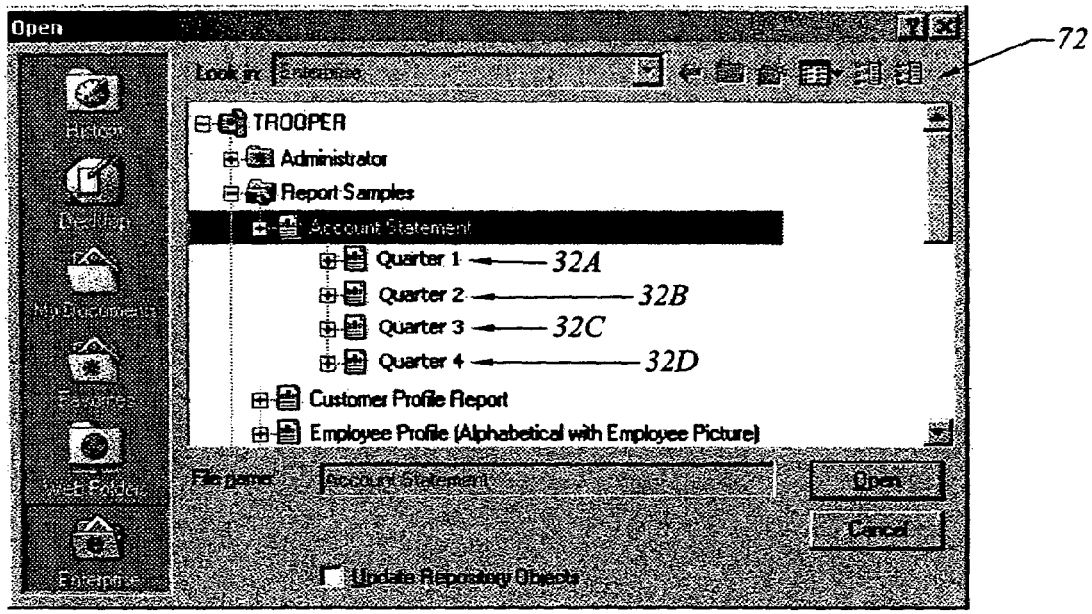
FIG. 4 illustrates a user interface that may be used to create a consolidated report in accordance with an embodiment of the invention.
Figure 5:
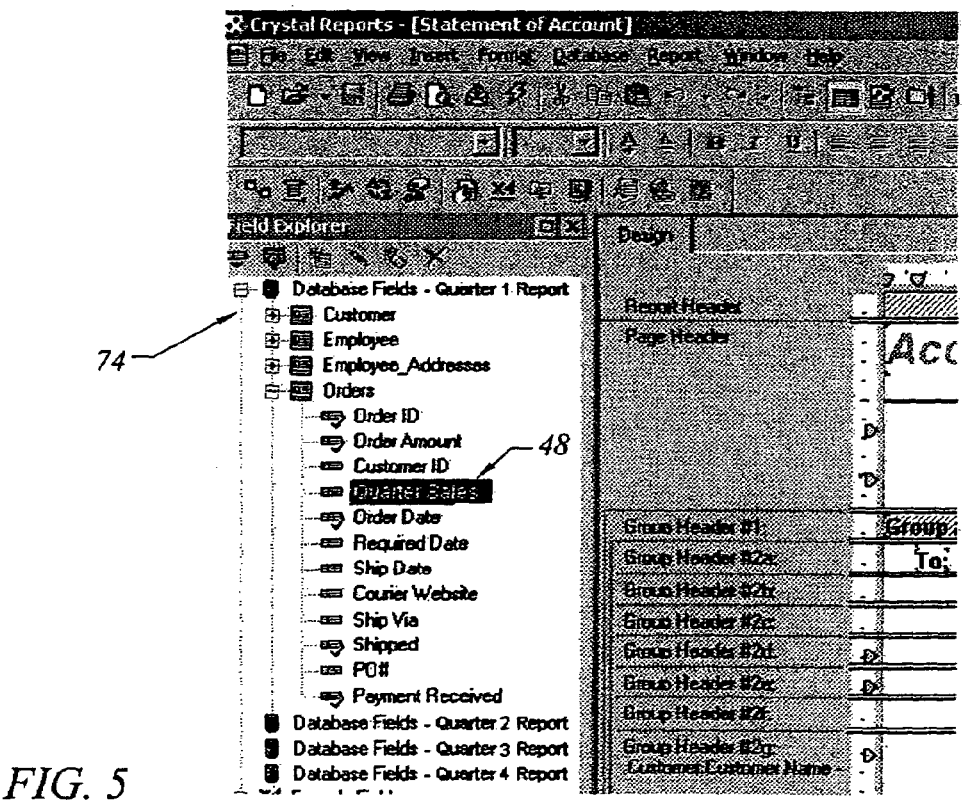
FIG. 5 illustrates another user interface that may be used to create a consolidated report in accordance with an embodiment of the invention.

Returning to FIG. 2, the next processing operation is to select consolidated report criteria (block 70). FIG. 4 illustrates a graphical user interface 72 that may be used in accordance with an embodiment of the invention to facilitate this operation. The graphical user interface 72 may be used to display a series of reports in a repository of reports. In this example, the available reports 32A-32D correspond to the reports 32A-32D shown in FIG. 3. In one embodiment of the invention, specific fields in the selected reports are then selected. The graphical user interface 74 of FIG. 5 shows a set of fields corresponding to the fields illustrated in the exemplary reports of FIG. 3. In this example, the quarter sales filed 48 is selected.

Alternate techniques may be used to select consolidated report criteria. In another embodiment of the invention, a prompt is provided for a data source. For example, the data source may be a report file path or a path of a directory that contains multiple report files. Preferably, a data context for a report path can be defined to limit the amount of viewed information. For example, a special character (e.g., "?") can be appended to a report path to limit information to selected fields of a report. Thus, for example, assuming a base report grouped by region, to see only the Quarterly sales records for the U.S. in a report, the following report path and data context can be used: c:\\Directory Name\Report Name.rpt?datacontext=/Country[US]. This example assumes a base report that is grouped by country and customer. Specifying the sum of sales in a country within the base report results a consolidated report listing this information. One can generate trend data for all countries (e.g., datacontext=/Country[*]) or trend data for a selected country (e.g., datacontext=/Country[US]).

In one embodiment of the invention, a consolidated report of the invention is created through the following instruction sequence:

1. On a standard toolbar, click New.
2. In a Reports Gallery, click As a Blank Report and then OK.
3. In a Database dialog box, expand Create New Connection and click OLE DB.
4. From a Provider list, select a Rowset Provider and click Next.
5. In a Data Source field, enter the name of the reports file(s) to use in the consolidated report.
6. Click Finish. (A data source called Reports is added to the OLE DB folder.)
7. Add the Reports data source to the Selected Tables area and click OK.

At this point, a consolidated data source is ready for use as any other data source for report creation. If the Reports node in the Field Explorer is expanded, the fields from each report specified as a data source may be displayed.

Preferably, special fields are provided to track specific information about the report fields in the data source. Example special fields include:

Report Path—This field shows the path and name of the report for the current record.

Group Path—This field shows the group level and record number of the current record in the report.

Record Number—This field shows the record number of the current record in the report.

Data Date—This field shows the date the data was last refreshed in the report.

Data Time—This field shows the time the data was last refreshed in the report.

Returning now to FIG. 2, the next processing operation is to analyze individual reports within a report repository based upon selected consolidated report criteria (block 80). Executable code is invoked to perform this operation. This results in the generation of a consolidated report (block 82).

FIG. 3 illustrates a consolidated report 28. In particular, the figure illustrates a consolidated report 28 with a first quarter sales field 90, a second quarter sales field 92, a third quarter sales field 94, a fourth quarter sales field 96, and a total sales field 98, which represents the sum of the individual sales fields. Observe here that the consolidated report 28 was created based upon data in individual reports 32A-32D, instead of accessing a database. Therefore, a new report is available without rebuilding the database schema.

The consolidated report 28 shows trends across data found in time stamped instances of other reports. Thus, the consolidated report 28 has captured snapshots of data over an extended period of time. It should be further appreciated that the database source of the individual reports used to generate the consolidated report 28 is irrelevant. Thus, the consolidated report 28 can be created from individual reports that were derived from disparate databases. Accordingly, the invention allows the merging of data from multiple databases, having either similar or disparate formats. It can also be appreciated that the invention reduces database accesses as new reports are generated from individual reports, not database accesses. In addition, the invention facilitates the decentralization of database computational activity. For example, individual reports may be created in branch offices and then transmitted to a central office. At the central office, a consolidated report is generated based upon the received reports from the branch offices.

Returning once again to FIG. 2, a final optional operation is displayed. In particular, an operation may be implemented to drill through to a source report (block 100). Preferably, each field in a consolidated report 28 has an associated link to its source report. By activating this link, the user is returned to the source report, thereby allowing drill down processing. Arrow 102 of FIG. 3 illustrates a link between the first quarter sales field 90 and its corresponding field 48 in source report 32A.

Figure 6:
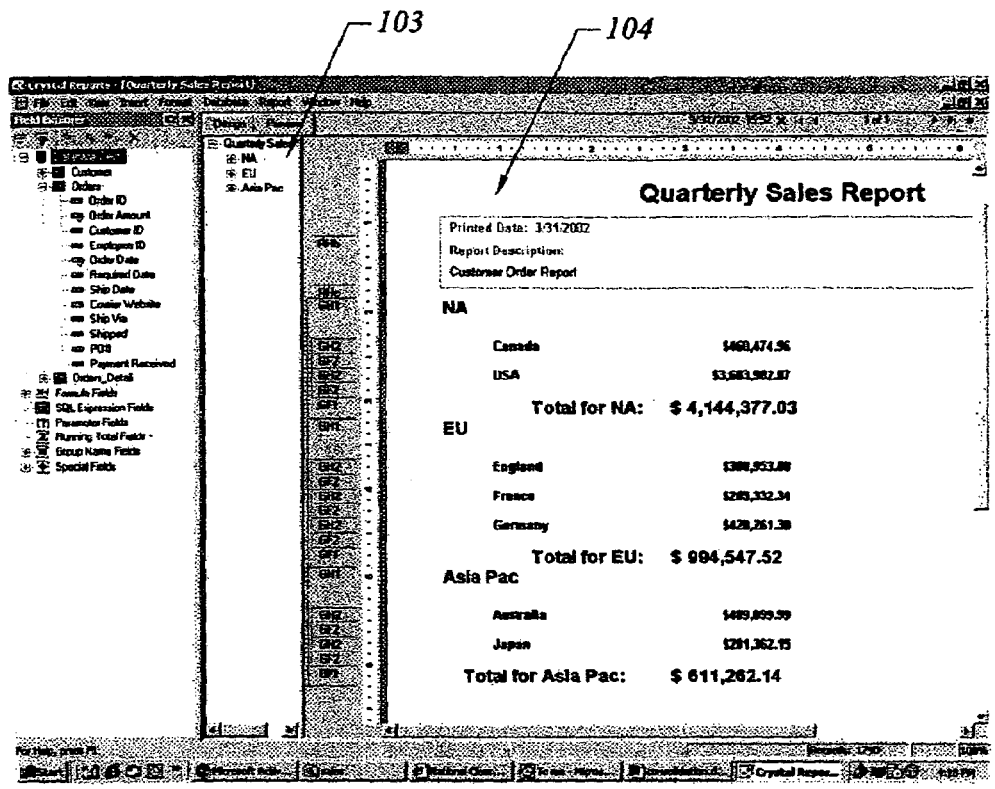
FIGS. 6-9 illustrate specific reports that may be used to create a consolidated report in accordance with an embodiment of the invention.
Figure 7:
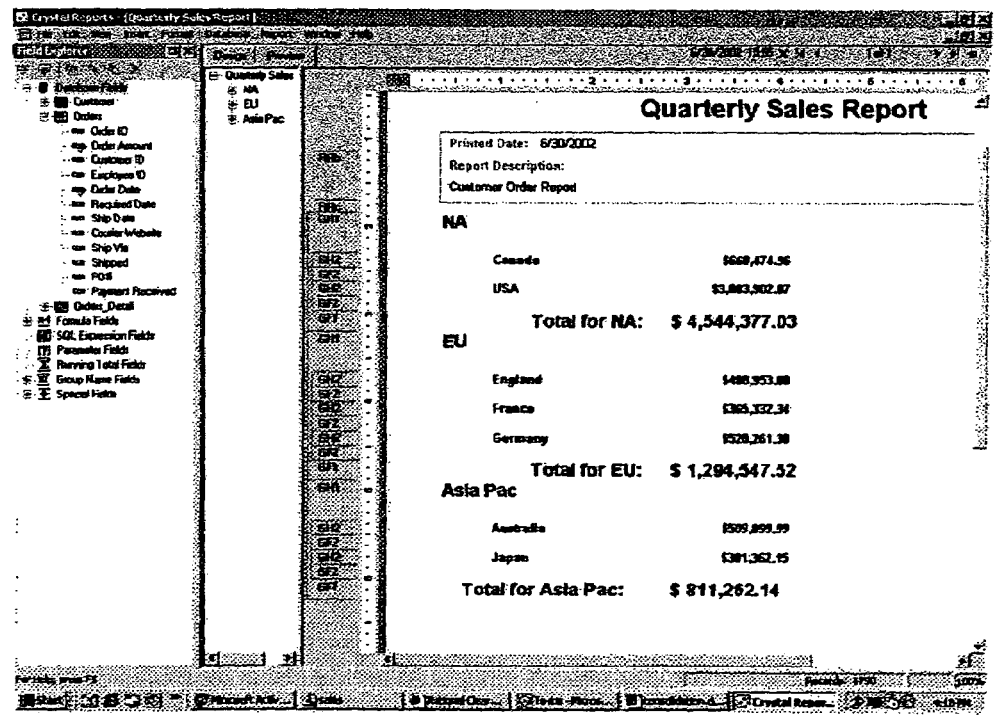
Figure 8:
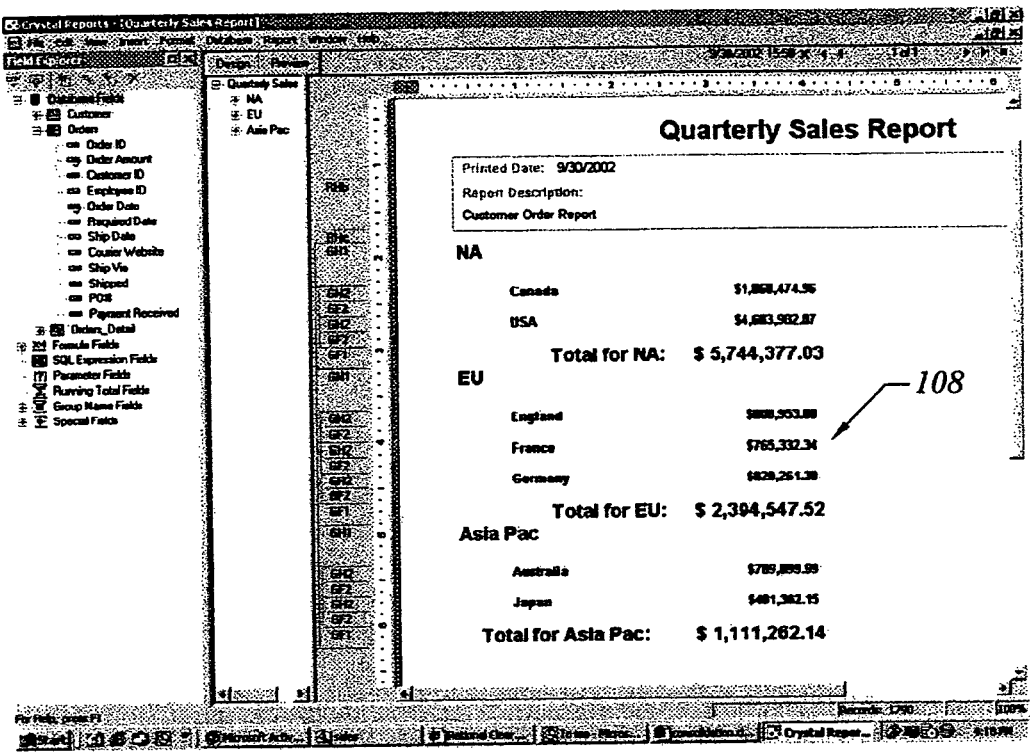
Figure 9:
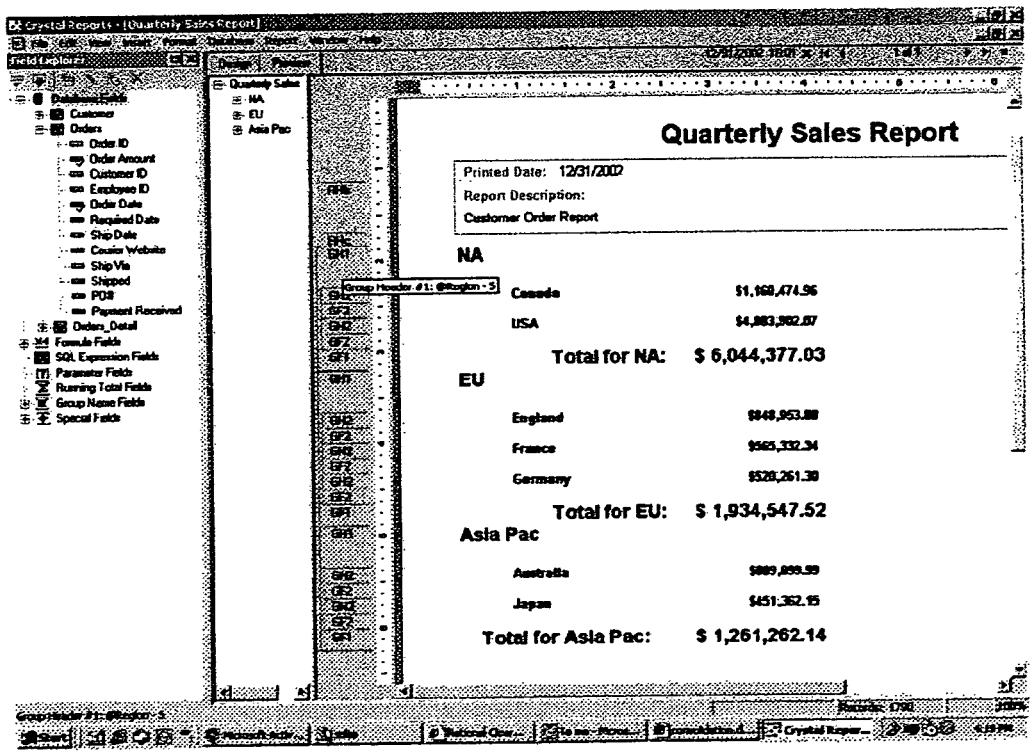

Now that the general features of the invention have been described, attention turns to a more specific example for the purpose of more fully illustrating the features and advantages of the invention. FIG. 6 illustrates a quarterly sales report. As shown in the design/preview window 103, this sales report specifies quarterly sales for North America (NA), Europe (EU), and the Asia Pacific (Asia Pac). The report window 104 illustrates a breakdown for North American sales by country, including the U.S. and Canada. The report also reflects a total sales amount for North America for the first calendar quarter ending Mar. 31, 2002. Similarly, the report reflects a breakdown for European sales by country, including England, France, and Germany. A total sales volume for the European region for the first quarter is also supplied. Similar information is provided for the Asia Pacific region. FIGS. 7-9 reflect the same information for the subsequent quarters of 2002.

Figure 10:
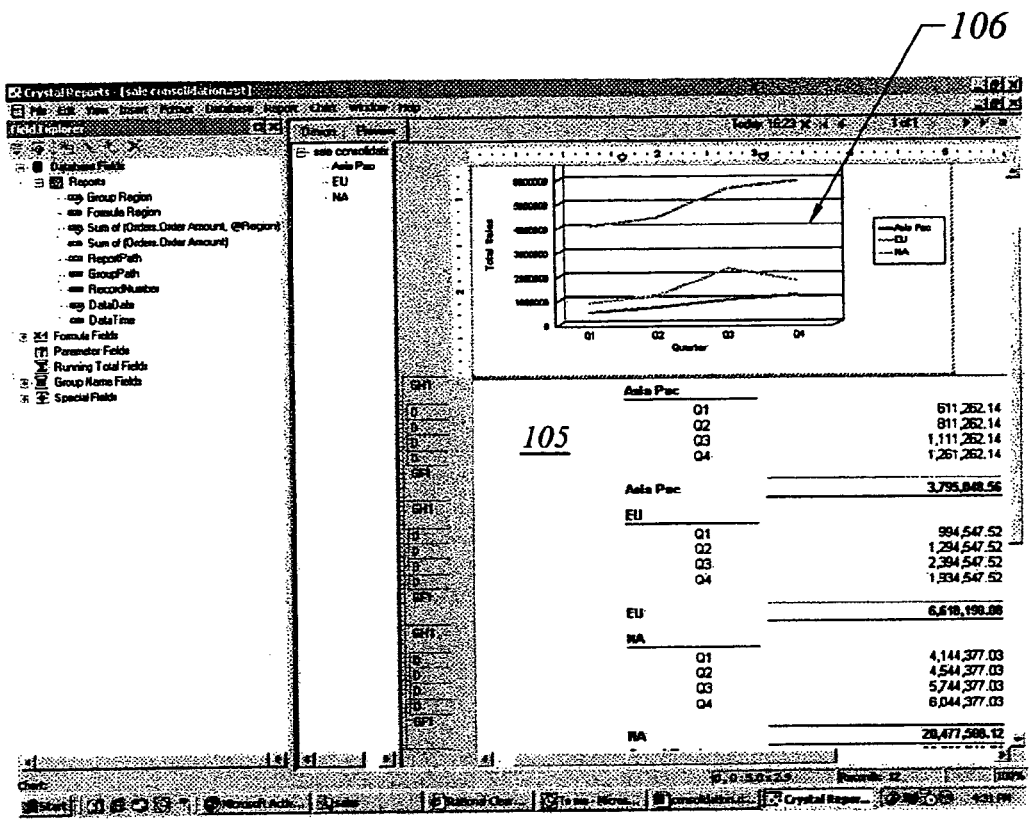
FIG. 10 illustrates a consolidated report created from the information of the specific reports of FIGS. 6-9 in accordance with an embodiment of the invention.

Using the previously described techniques, a consolidated report can be produced from the individual reports of FIGS. 6-9. The resultant consolidated report is shown in FIG. 10. The consolidated report 105 of FIG. 10 illustrates quarterly sales and total sales for each region (i.e., Asia Pacific, Europe, and North America). The tabular numeric data is also supplied in a graph 106 in this example.

Figure 11:
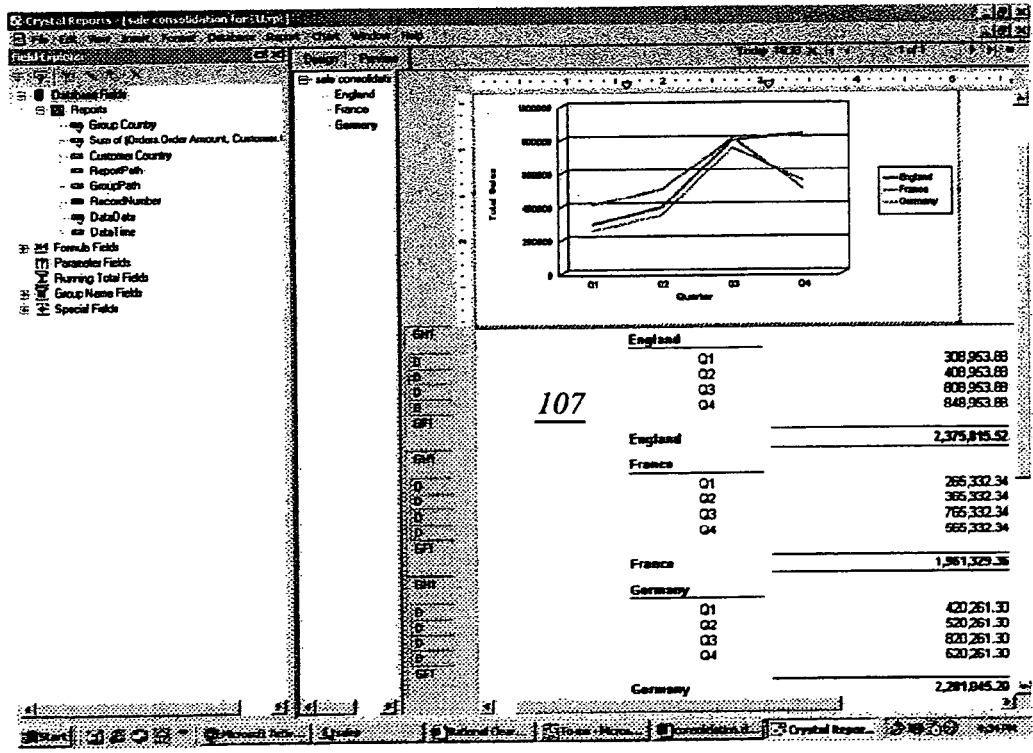
FIG. 11 illustrates the operation of expanding information in a consolidated report in accordance with an embodiment of the invention.

In accordance with an embodiment of the invention, the reports used to generate the regional data can be invoked. By way of example, FIG. 11 illustrates an expanded regional data report 107. In this example, the expanded regional data is for Europe and includes individual quarterly and total sales for England, France, and Germany.

Figure 12:
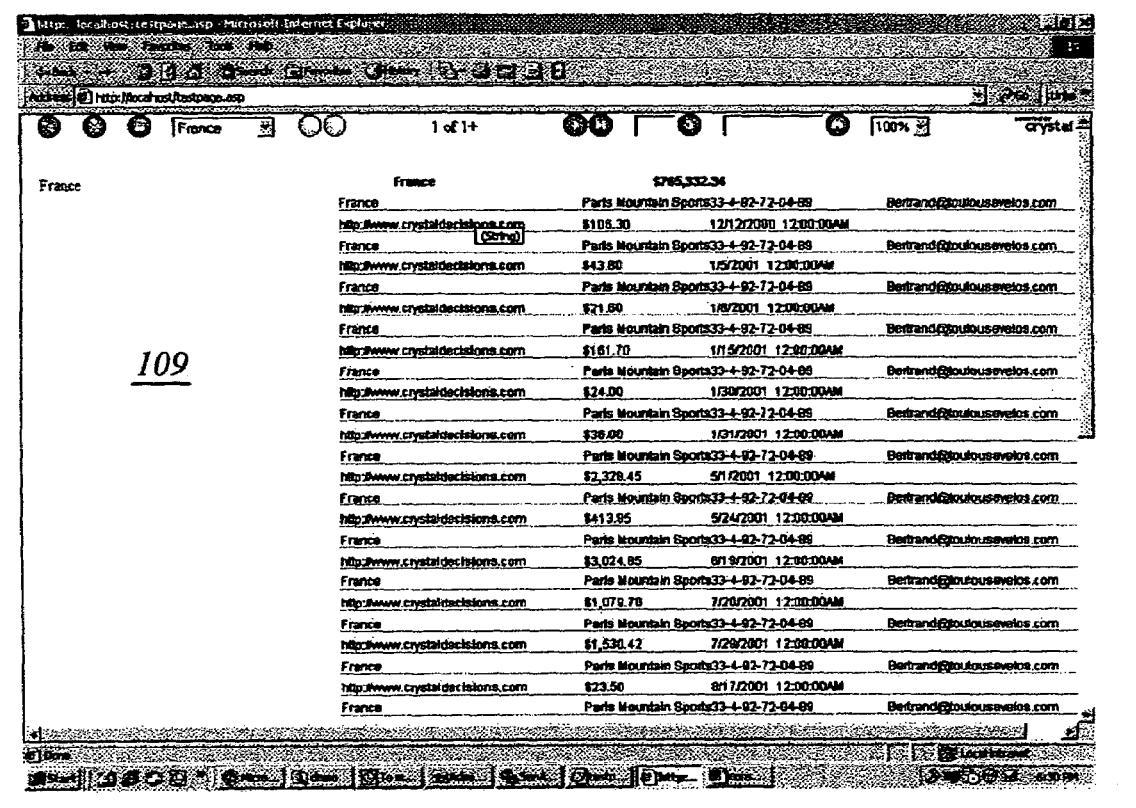

In accordance with an embodiment of the invention, further expansion or drill through to source reports can be accomplished. For example, if the link associated with the third quarter sales for France is activated, then the user receives the report of FIG. 8. If the user activates the France link 108 of FIG. 8, then a detailed sales report for France in the third quarter is supplied, as shown in FIG. 12. The detailed report 109 of FIG. 12 provides information on the individual sales transactions that produced the third quarter sales total (i.e., $765,332.34) for France.

Figure 13:
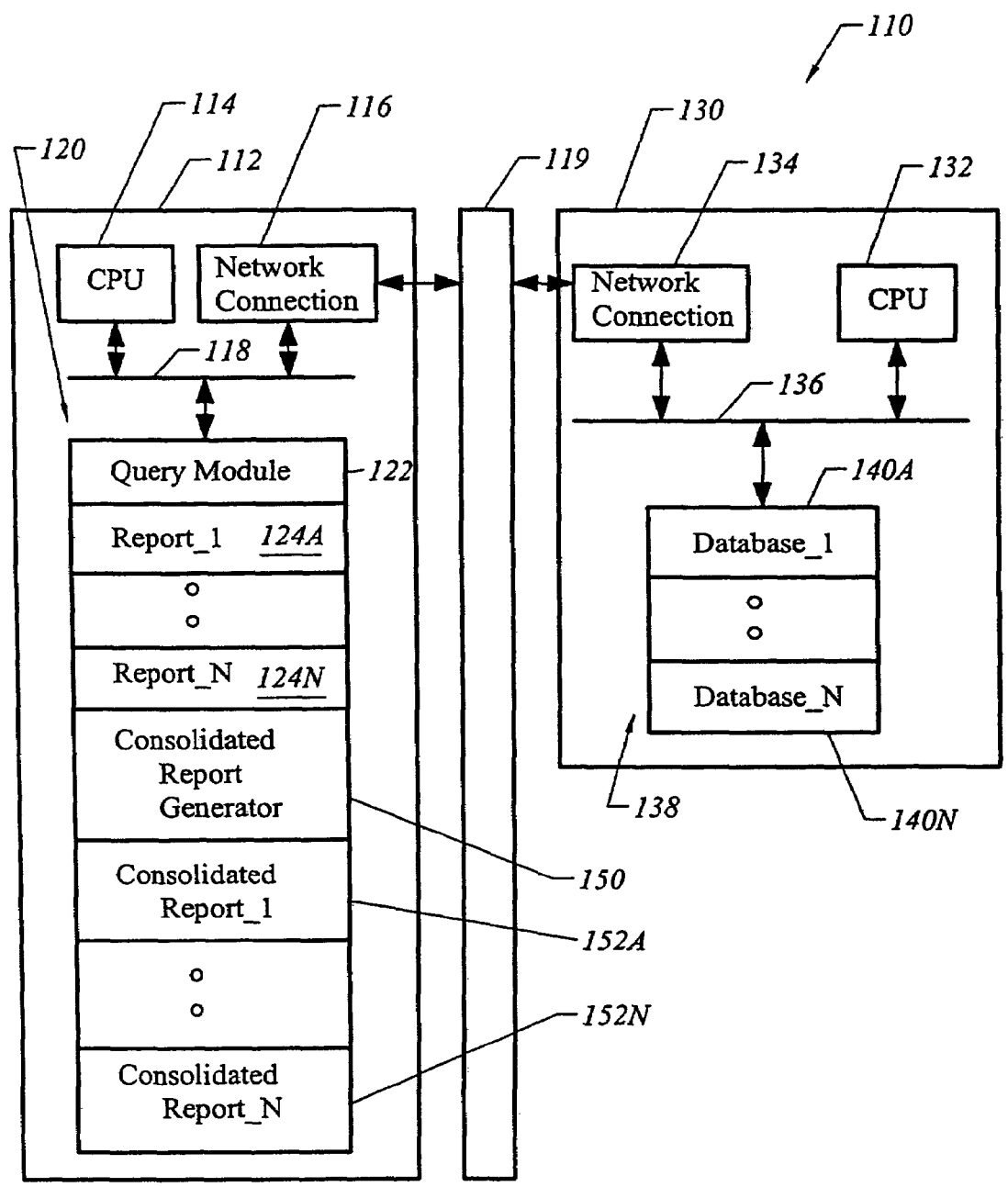
FIG. 13 illustrates a computer network architecture that may be utilized to implement embodiments of the invention.

FIG. 13 illustrates a computer network architecture that may be utilized to implement embodiments of the invention. The computer network architecture 110 includes a client computer 112. The client computer has a central processing unit 114 connected to a network connection circuit 116 via a bus 118. The network connection circuit 116 is also connected to a network transport medium 119, which may be any wired or wireless transport medium. A set of input/output devices (not shown) is also attached to the bus 118 to allow a user to input and view data.

A memory 120 is also connected to the bus 118. The memory 120 stores a set of executable programs. One executable program is a query module 122 (e.g., a report generation tool). The query module 122 utilizes standard techniques to produce a set of reports 124A-124N.

The query module 122 may access one or more databases resident on the client computer 112. However, in this example, the query module 122 accesses one or more databases resident on server computer 130. Server computer 130 includes a central processing unit 132 connected to a network connection circuit 134 via a bus 136. The network connection circuit 134 is also connected to the network transport medium 119. A set of input/output devices (not shown) is also attached to the bus 136 to allow a user to input and view data. A memory 138 is also connected to the bus 136. The memory 138 stores one or more databases 140A-140N.

A consolidated report generator 150 may be executed from either the server computer 130 or the client computer 112. In this example, the client computer 112 includes a consolidated report generator 150 with executable instructions to implement the operations described herein. This results in the creation of one or more consolidated reports 152A-152N. Additional consolidated reports may be formed from the information contained in individual consolidated reports.

Returning to FIG. 13, a report part insertion module 1000 includes a set of executable instructions to select a consolidated report from reports 152, select a report part from an existing report (e.g., using the report parts tool 118), and then insert the report part into an electronic document, for example selected from a repository of electronic documents 1002.

Ideally, a link between the report part and the original report source is maintained, in accordance with an embodiment of the invention.

Figure 14:
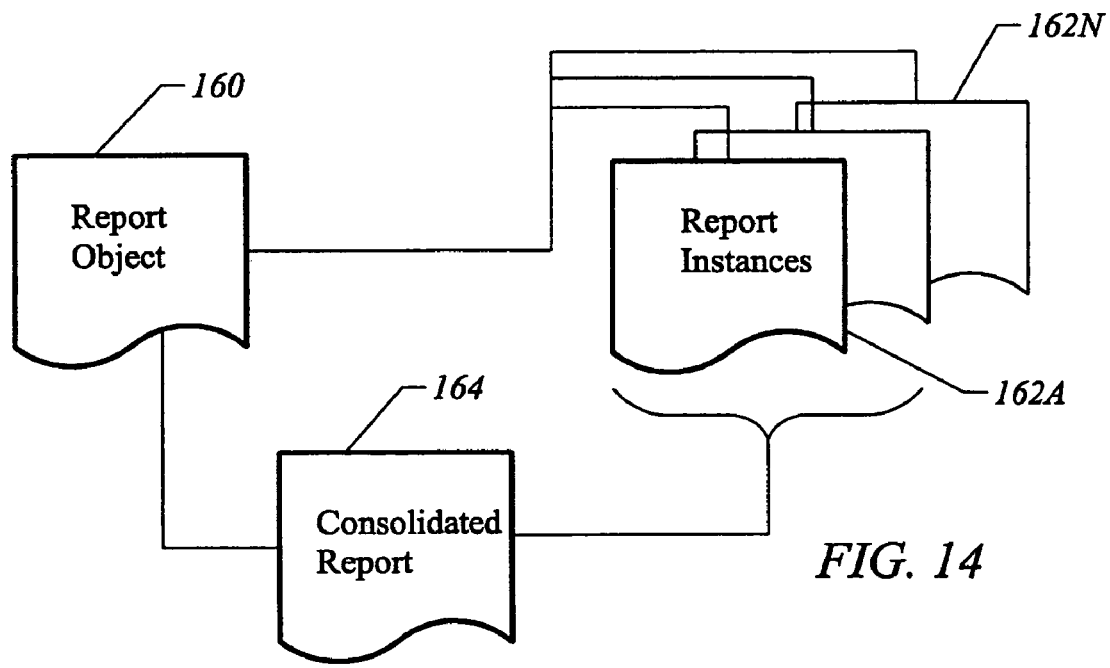
FIG. 14 illustrates a consolidated report architecture that utilizes a report as a root object in accordance with an embodiment of the invention.

FIG. 14 illustrates a consolidated report architecture that utilizes a report as a root object in accordance with an embodiment of the invention. A report object 160 is used to produce report instances 162A-162N. The consolidated report generator 150 uses the report object 160 to define fields for a consolidated report, as discussed in connection with FIGS. 3-5. The consolidated report generator 150 also produces a consolidated report 164 based upon data contained within the report instances 162A-162N, as previously discussed.

Figure 15:
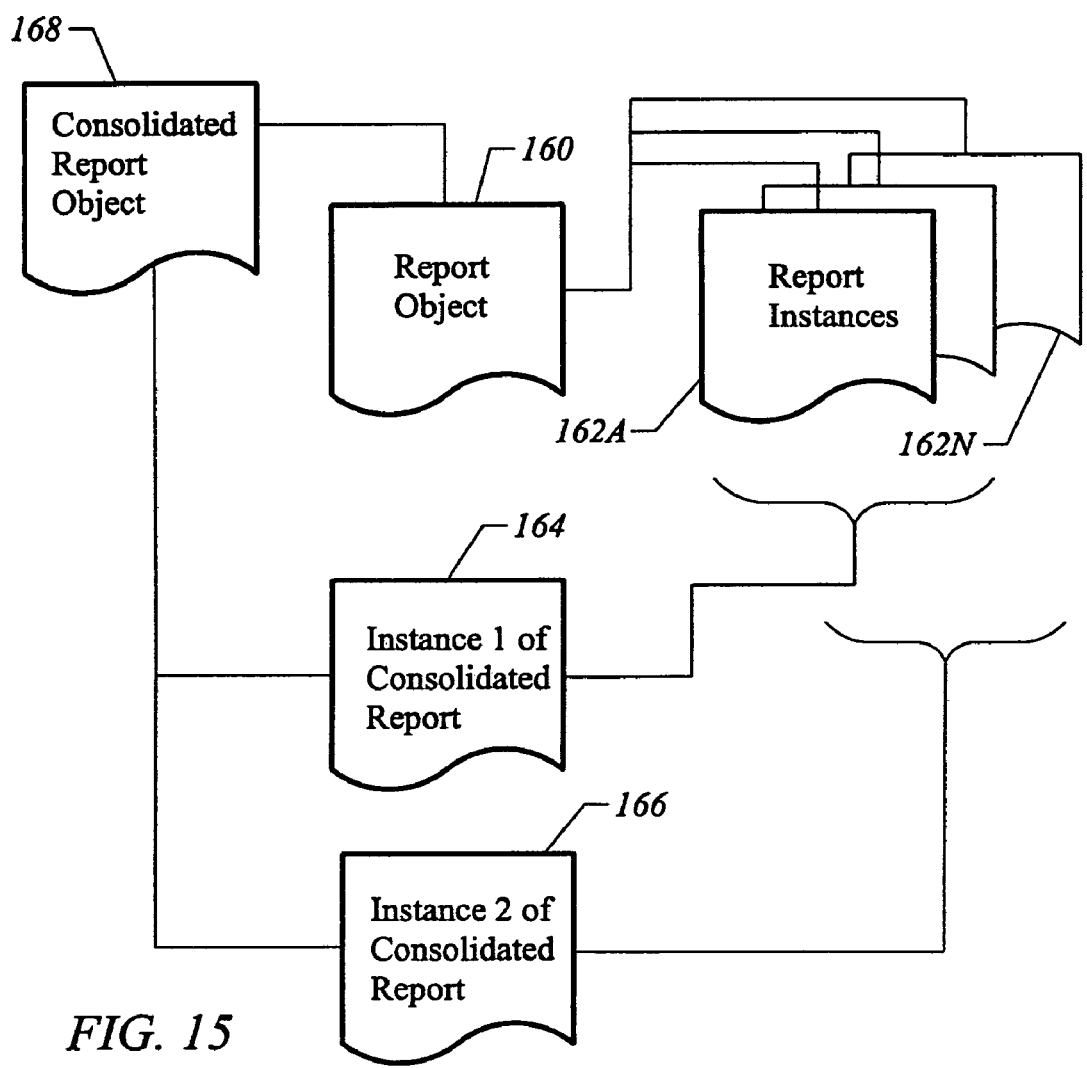
FIG. 15 illustrates a consolidated report architecture that utilizes a root object in accordance with an embodiment of the invention.

FIG. 15 illustrates a consolidated report architecture that utilizes a root object in accordance with an embodiment of the invention. A report object 160 is used to produce report instances 162A-162N. The consolidated report generator 150 is used to produce a first instance of a consolidated report 164 and a second instance of a consolidated report 166 based upon the data in the report instances 162. A consolidated report object 168 operates as a parent object to the consolidated report instances 164, 166.

Figure 16:
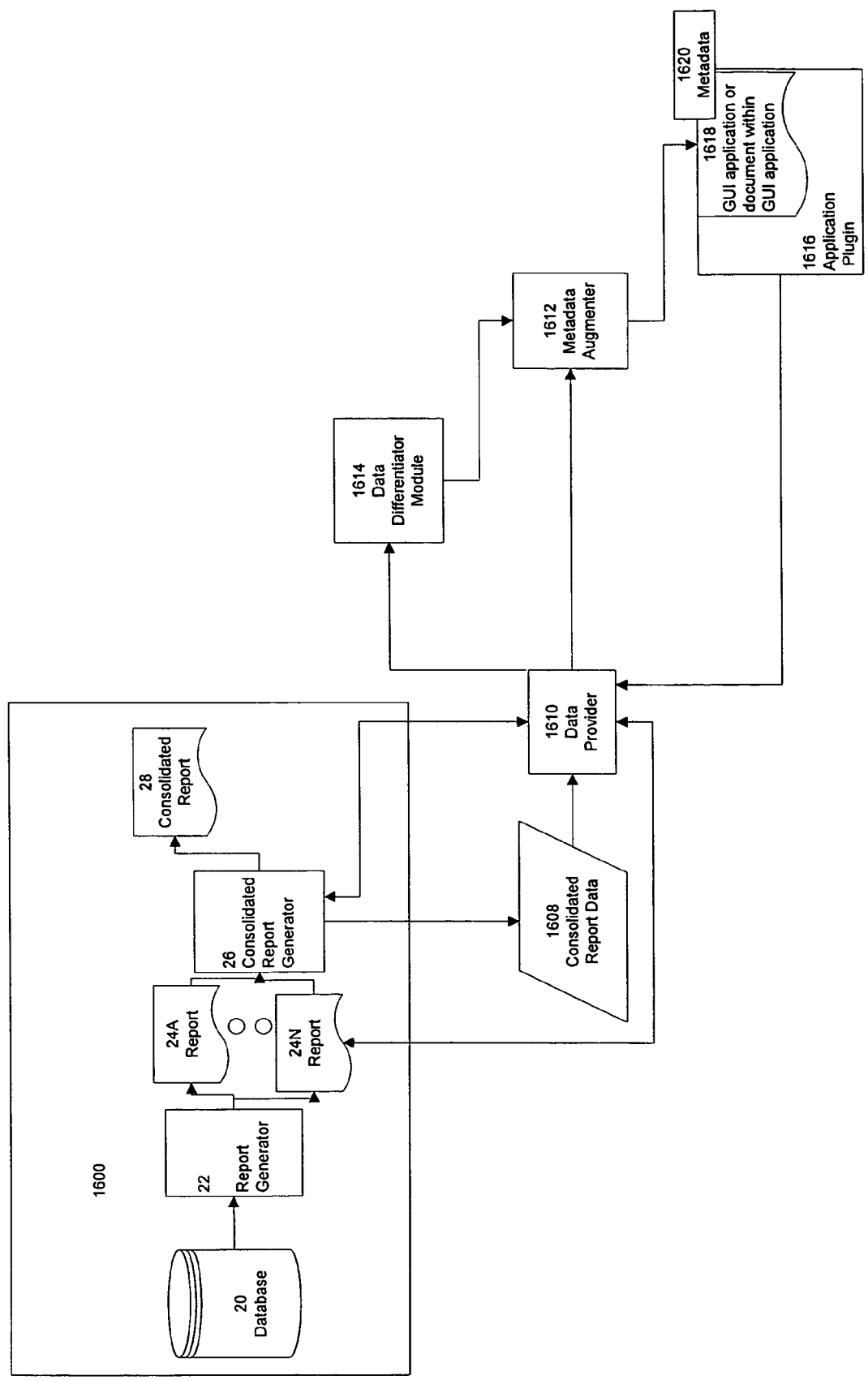
FIG. 16 illustrates a further embodiment of the system for creating new reports from discrete reports in which the consolidated data is inserted into an electronic an document.

FIG. 16 illustrates an embodiment of the concepts of the invention in which consolidated report data is embedded as a data set into an electronic document (e.g., a non-report or application) while maintaining links to the original report source. The concepts of the invention may be utilized to facilitate additional functionality such as drill down or opening the original report.

As previously discussed and illustrated in FIG. 1, a database 20 operates as a data source. Executable instructions associated with a report generator 22 are used to generate a set of reports 24A through 24N. A consolidated report generator 26 (e.g., executable code associated with consolidated report generation) produces a consolidated report 28.

Alternately, as shown in FIG. 16, in one embodiment the consolidated report generator 26 includes executable code to produce consolidated report data as a data set 1608. In this embodiment, the generation of the data set and the report are separate processes and the generation of a report is not a requirement. Observe that the consolidated report generator 26 does not access the data in the database 20; rather, the consolidated report generator 26 uses the data in the reports 24A-24N as a data source. Advantageously, report instances 24A-24N may contain specific saved historical data that is not necessarily stored within the database.

In accordance with the invention, the consolidated report generator 26 may include executable instructions forming a data provider 1610 and a metadata augmenter 1612 that operate to insert the consolidated report data 1608 within an electronic document 1618. The electronic document 1618 may be an existing Graphical User Interface (GUI) application or an electronic document, such as a non-report document.

In one implementation, the data provider 1610 is based on protocols, such as the Common Object Request Broker Architecture (CORBA), a Component Object Model Dynamic Link Library (COM DLL) or a web service. The consolidated report data 1608 may be constructed such that it maintains formatting from the original report source or so that it is passed as unstructured data values.

The Metadata Augmenter 1612 includes executable instructions to add metadata to the consolidated report data 1608. In one embodiment, the metadata is inserted as tags (such as Microsoft Smart Tags™ or custom XML tags). In another embodiment, the metadata is stored in an associated table or index. When the data set is inserted in a document or application, the metadata maintains contextual report and data source information that links the inserted data points to the source report and database data 20. This metadata is maintained if the data set is copied to a different location within the same document or is copied from the first document into a second document.

In one embodiment, this metadata includes both data source and report source information, and the report source information includes the report path, group path, and field for the data as well as the data date and data time for the report (time stamp). The metadata is extensible and additional information may be stored in the metadata including security information, data history, comments, data validity, and the last presentation value for the data.

In one embodiment, an application plugin 1616 receives user or programmatic requests to refresh the data set, drill down, or open the source report. Based on a request from the application or user, the application plugin passes metadata and parameters including any other required information, such as user permissions, to the data provider 1610, which then works with the consolidated report generator 26 in order to refresh the data. The database 20 and report repository 24A-24N may be remote or stored locally on the user's computer. Additionally, the user can interact with the inserted consolidated report data by drilling down on the source report data (for example moving from a country level view of the data, to a state level view of the same data, to a city level view of the same data). During drill down the report is accessed and a set of consolidated report data with the more detailed information is provided. In one embodiment, the updated report data is presented in the same format as the consolidated report data that was displayed before drill down.

In one embodiment, the application plugin 1616 receives user or programmatic requests to create a data set that differentiates between two sets of values (for example, two report instances for corporate sales that have different dates). Based on a request from the application or user, the application plugin passes parameters and any other required information, such as user permissions, to the data provider 1610 accesses the report repository 24A-24N, in order to retrieve the requested data sets. The data provider then passes the data to the data differentiator module 1614, which constructs calculated values based on the provided values, and passes these calculated values to the Metadata Augmenter 1612 that augments the data with metadata and passes it back either directly in the electronic document 1618 or to the electronic document through an application plugin 1616.

Figure 17:
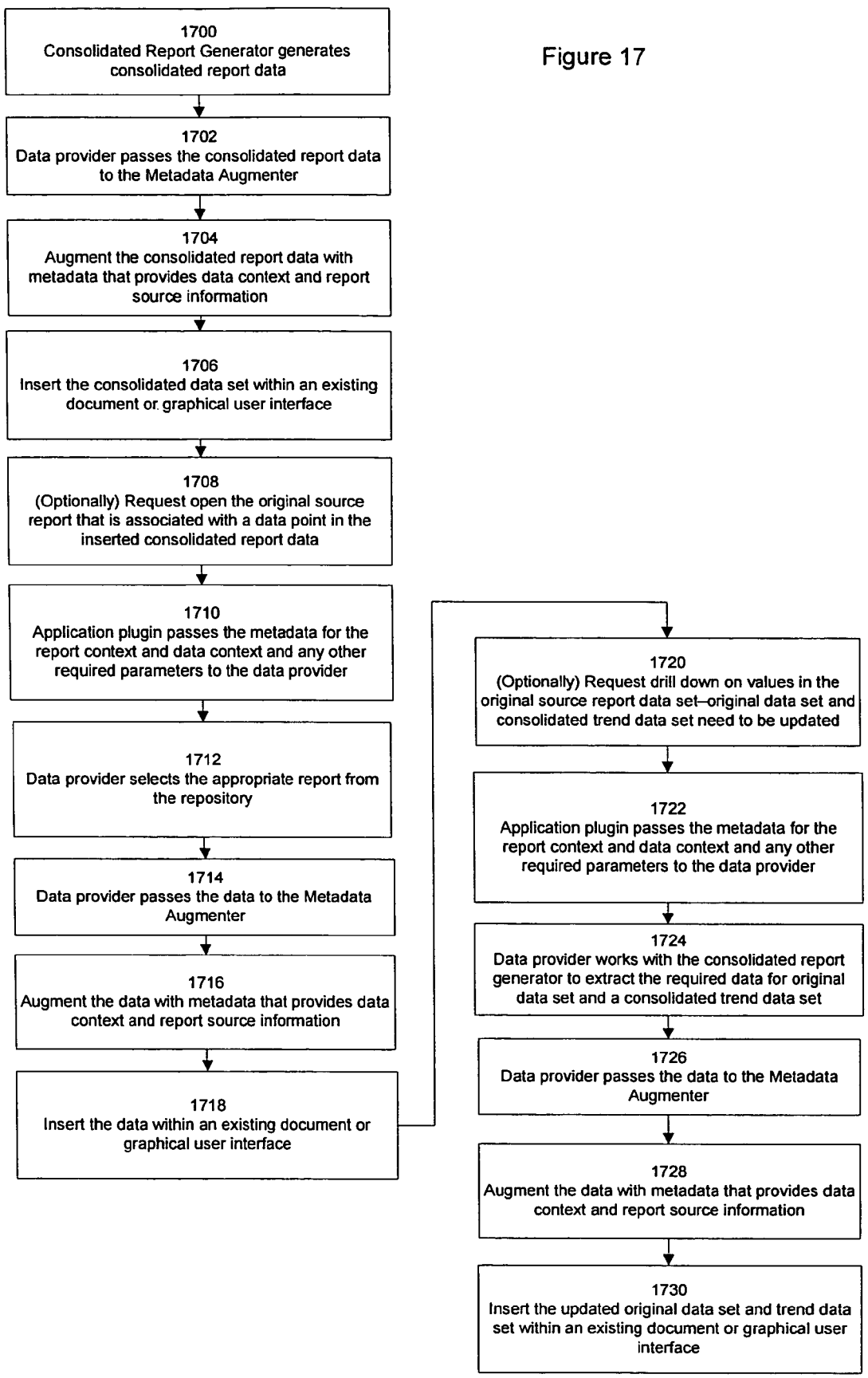
FIG. 17 illustrates processing operations performed in accordance with an embodiment of the invention for generating a consolidated data set and inserting the consolidated data set into an electronic document.

FIG. 17 illustrates processing operations associated with executable instructions for inserting a consolidated data set into an electronic document and opening a source report for a data point and drilling down on a data point.

Initially, consolidated report data is generated 1700. As illustrated in FIG. 16, the Consolidated Report Generator produces consolidated report data as a data set. This consolidated report data is passed by the data provider to the metadata augmenter 1702. The data set is augmented with metadata that provides the data source and report source information 1704. The metadata is extensible and may include other information concerning security or the last format in which the data was displayed. The consolidated data set is then inserted within the electronic document 1706. In one embodiment, this insertion is facilitated by an application plugin.

After the data set has been inserted within the electronic document or GUI, the user has the option of opening the report that is the source for a data point within the inserted data set and then drilling on the data from the report to see data for subgroups. In one embodiment, drill down in the original data set causes an update to the trend data set.

When a request to open the original source report data is received 1708, the application plugin passes the metadata for the report context and data context (and any other required parameters) to the data provider 1710. The data provider selects the appropriate report from the repository and extracts the required data 1712 and passes it to the metadata augmenter 1714. The data is augmented with metadata 1716 and is inserted within the existing electronic document 1718.

After the original source report data is displayed, the user can request drill down on the original source report data set. In one embodiment, in addition to refreshing the original source report data set to display the new subgroup values, the trend data that is displayed is also updated. Either programmatically or based on user interaction a request is received to drill down on one of the data values 1720. This request to drill down on the data triggers the application plugin to pass the metadata for the report context and data context (and any other required parameters) to the data provider 1722. The data provider works with the consolidated report generator to extract the required data 1724. In the case of the original source report data, the data provider interacts directly with reports within the repository and in the case of a consolidated data set, the data provider passes a request to the consolidated report generator. The data provider passes the data to the metadata augmenter 1726. The data is augmented with metadata 1728 and is inserted within the existing electronic document 1730.

In one embodiment, the user can also change the parameters that filter which data from the report is displayed. This causes a refresh in the data that is displayed within the electronic document, but does not require accessing the data provider. The full set of report data has already been cached and therefore the refresh takes place against the report data that already exists in cache for the electronic document. The report data is redrawn to display the change in parameters.

Figure 18:
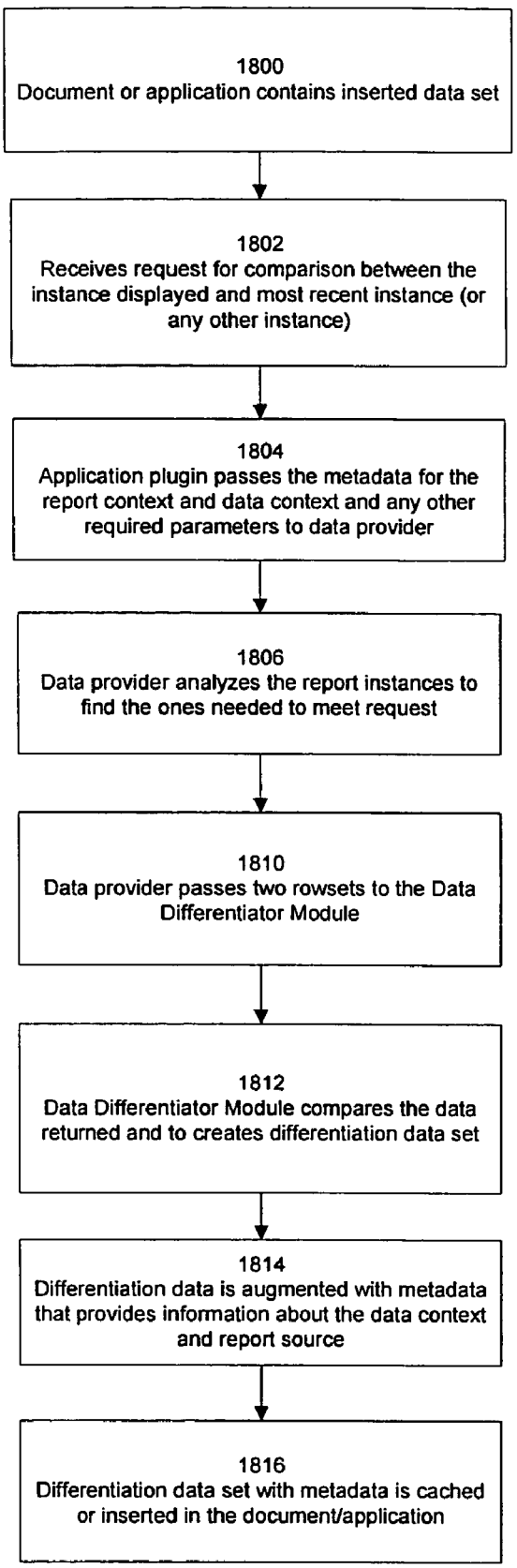
FIG. 18 illustrates a process for generating a data set with calculated differences and inserting the data set into an electronic document.

FIG. 18 illustrates one embodiment of the process for creating a consolidated report data set that has calculated differentiated values. The process starts with a document or application that contains an inserted data set 1800. FIG. 17 illustrates the process for generating this initial inserted data set. A request is received to compare the instance displayed and another instance 1802. In one embodiment, the displayed instance is compared to an instance that has the most current data. In another embodiment, the displayed instance is compared to the most recent previous instance of the displayed report data as indicated by a time stamp.

The application plugin passes the request including the metadata and any other parameters to the data provider 1804. The data provider analyzes the report instances to find the instances needed to meet the request 1806. The data provider passes two row sets to the data differentiator module 1810. The data differentiator module compares the two row sets and constructs a third row set that shows the differences between the first two row sets and their values 1812. This third row set is augmented with metadata 1814. In one embodiment, the metadata for the third row set includes information about the report and data context for the values used in the calculation.

In one embodiment, the data differentiator module includes executable code to perform additional calculations such as corrections for different currency values or other accounting factors that may affect the interpretation of the data when it is combined.

The consolidated differentiation data set that shows the differences between the two data sets is then either cached for future use or inserted within the electronic document 1816.

Figure 19:
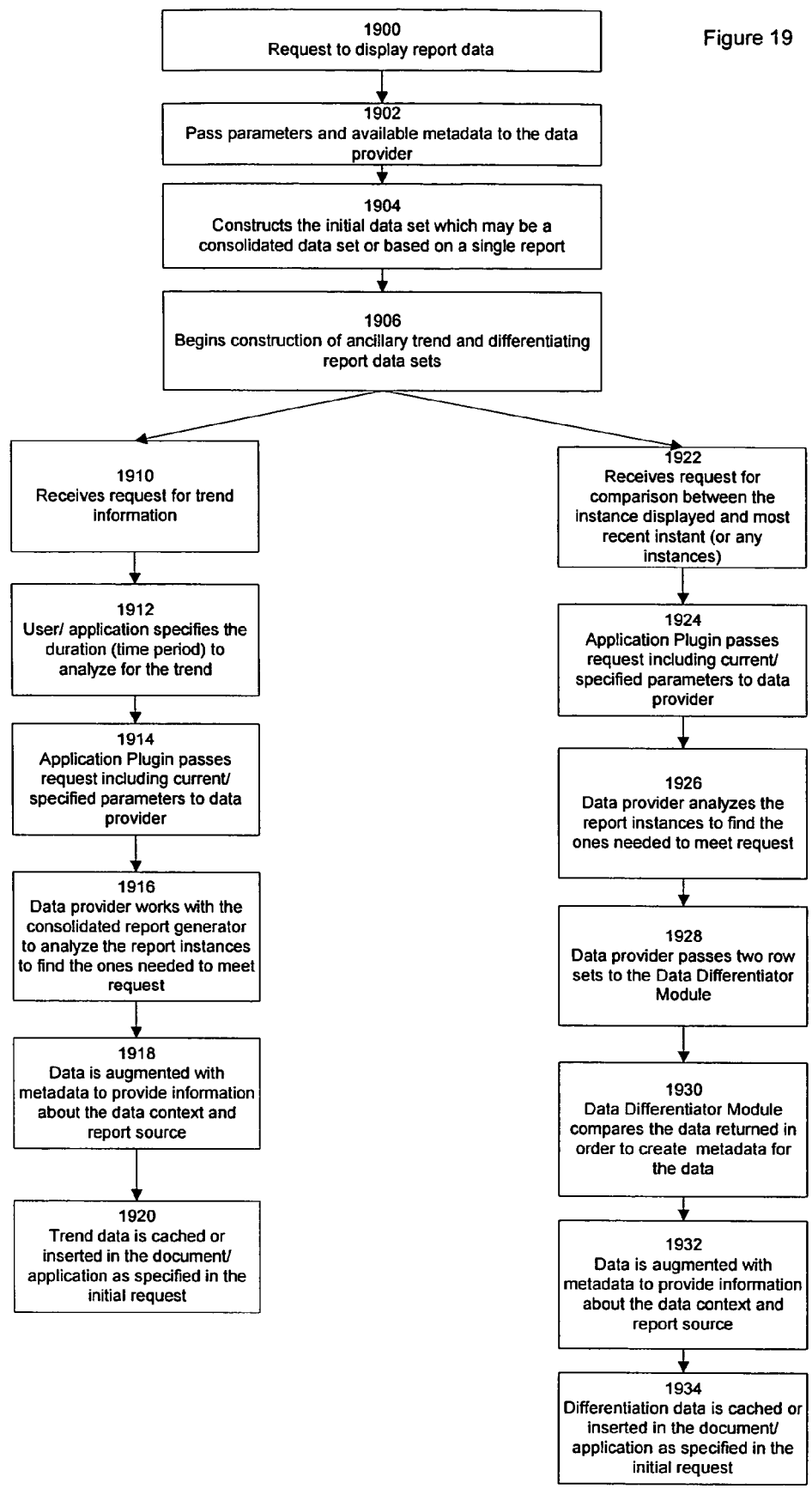
FIG. 19 illustrates a process for generating trend and differentiation data when displaying either a consolidated data set or a data set based on a single report.

FIG. 19 illustrates one embodiment of the process for creating a consolidated report data set wherein the process of creating additional data sets that contain trend information and calculated differentiated values occurs at the same time that the primary data set is generated and inserted. Initially a request to display report data is received 1900. This request may be based on either a user interaction or a programmatic request. The application plugin passes the required parameters and any available metadata to the data provider 1902. The data provider constructs the initial data set based on the requirements specified 1904. In the case of a consolidated data set, the data provider works with the consolidated report generator. This initial data set may be constructed based on consolidating data set from multiple reports or may be based on the data from a single report. After the initial data set is constructed it is used as the basis for datasets that show trends and the differentiation between this initial data set and other sets 1906.

In the case where the trend information is requested for the initial data set 1910, the application plugin passes the request to the data provider that works with the consolidated report generator to construct the consolidated data set. The user specifies, or there is programmatic specification of, the duration for which the trend should be analyzed 1912. The application plugin passes the request including parameters and any available metadata to the data provider 1914. The data provider works with the consolidated report generator and analyzes the report instances to find the report instances needed to meet the request 1916. The trend data set will reflect the scope of the trend information requested, which in one embodiment is based on a chronological time range and in another embodiment is based on a specific number of report instances. The trend data is then augmented with metadata 1918 and is either cached or inserted within the electronic document as specified by the initial request 1920.

In the case where differentiation data is being generated 1922, the application plugin passes the request including parameters and any available metadata to the data provider 1924. The data provider analyzes the report instances in the repository to find the report instances needed to meet the request 1926. The data provider passes two row sets to the data differentiator module 1928. The data is compared in order to generate a third row set of calculated values for the difference between the data sets 1930. FIG. 18 provides more detail about this process. The data for the differences is augmented with metadata that provides information about the data context and report source 1932. This differentiation data is then either cached or inserted within the electronic document as specified by the initial request 1934.

The process illustrated in FIG. 19 enables an initial data set (that may be a consolidated data set or based on a single report), a differentiation data set and a trend data set to be generated during the initial request.

Figure 20:
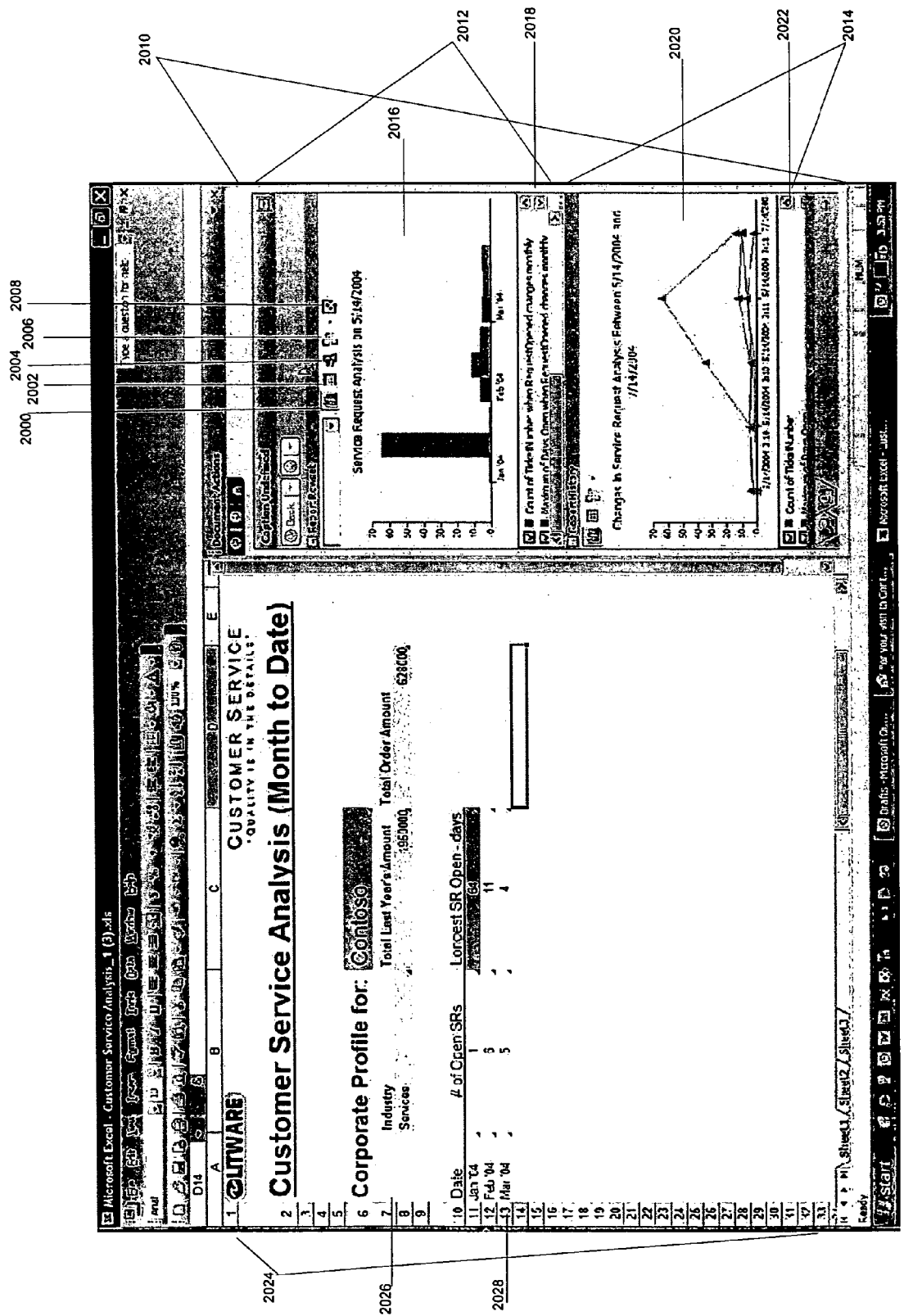
FIG. 20 illustrates a graphical user interface in which a consolidated report can be integrated into an electronic document.

FIG. 20 illustrates a Graphical User Interface (GUI) embodiment of the invention in which consolidated report data is inserted data within a Microsoft Excel™ spreadsheet and ancillary data sets that show trends and differentiation for this data are displayed.

The first panel 2024 is the Microsoft Excel application in which the report data has been inserted. In the example, data from two different data sources is displayed. The top table of data 2026 is from a report based on a CRM (Customer Relationship Management) database. The second table 2028 is from a consolidated data set based on multiple instances of a report that is based on a database of service request data.

The second panel 2010 contains two sections. One section 2012 displays the current report (or a report showing differentiated data, see FIG. 21). The other section 2014 shows the report history which provides the trend information for data points over time. Various options may be selected to alter the view of the data. In this embodiment, a chart option 200 and a data table option 2002 are provided. An option 2004 may also be used to view changes in the report data (calculated differentiation). Option 2006 is used to access Microsoft Smart Tag™ functionality, while option 2008 is used to display the appropriate section of the full report in Crystal Reports. Interaction between the panels 2024 and 2012 and 2014 can be used to update data views, insert data in the document, and view data details.

Figure 21:
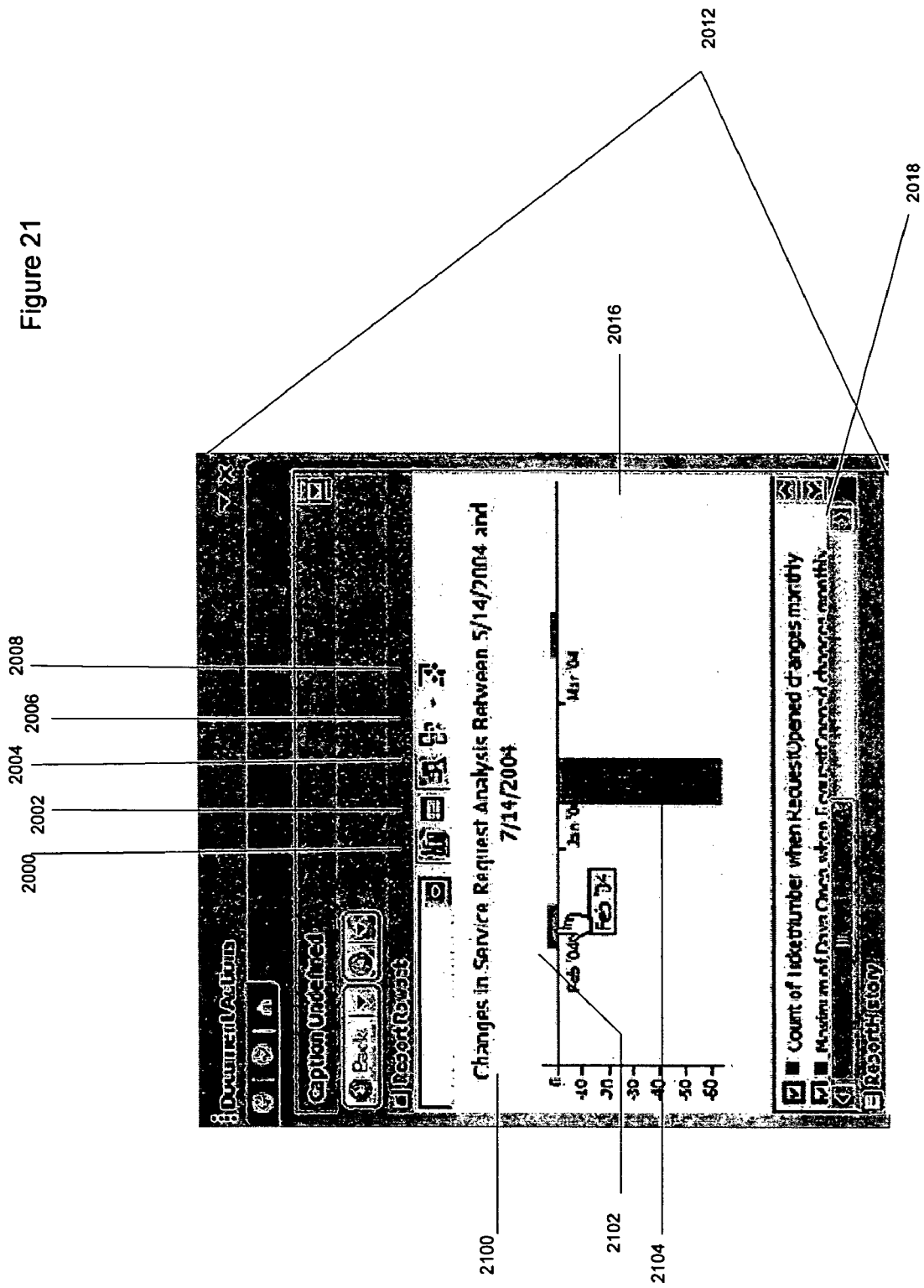
FIG. 21 illustrates a graphical user interface in which a consolidated report based on a calculated difference can be integrated into an electronic document.

FIG. 21 illustrates a Graphical User Interface (GUI) embodiment of the invention in which differentiation between consolidated report data is displayed. FIG. 21 illustrates a section 2012 that corresponds to section 2012 in FIG. 20. This results when the option to illustrate differentiated data 2004 is selected. The graph shows the calculated differences between the values for the data set between two different dates (May 14, 2004 and Jul. 14, 2004) with positive differences 2102 shown above zero and negative differences 2104 (where the value was greater for May 14, 2004 than for Jul. 14, 2004) shown below zero. In one embodiment, the secondary data set against which the primary data set is differentiated is the most current data set, in another embodiment the secondary data set is the most recent data set previous to the displayed data set.

Figure 22:
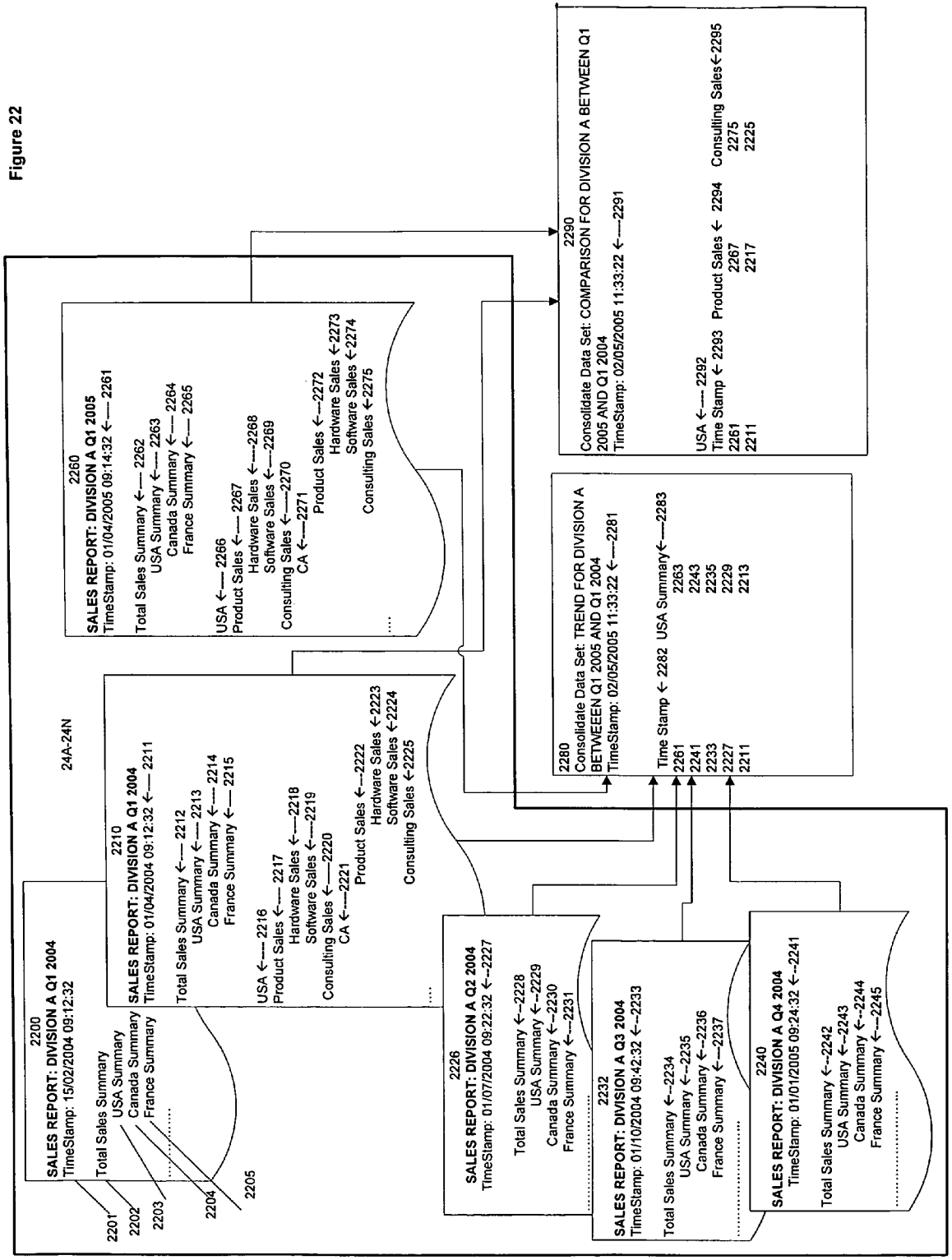
FIG. 22 illustrates specific reports used to construct a consolidated data set.

FIG. 22 provides an illustration of sample reports within a report repository 24A-24N used to build consolidated data sets that show trends. Reports 2200, 2210, 2226, 2232, 2240 and 2260 all provide information for the same subject (Sales for Division A) at different times. The time stamps (2201, 2211, 2227, 2233, 2241, 2261) indicate the time at which the data in the report instance was saved. Report selection from the repository uses various criteria to select reports based on their timestamps. For example, if the current report data displayed was from the Q1 2005 report 2260 and the criteria specified was the previous three reports, the data would be consolidated from report 2260, report 2240, report 2232, and report 2226. Likewise, if the data from report 2210 was displayed and the criteria specified to consolidate data based on date time stamp proximity and the report with the closest timestamp before the displayed report, the data would be consolidated with data from 2200 and if the proximity was specified as closest to the time stamp, but more recent, the consolidated data would contain data from 2226. If the selection criteria specified merely the most current timestamp, then the consolidated data set would include the data from 2260.

The structure of the report, in particular the data grouping, is used to align the data within the data sets in some embodiments. As shown in reports 2210 and 2260 there is a summary group 2212/2262, that contains summary data grouped by country. Underneath this summary group 2212/2262, there is a new group based on country. Within the country group 2216/2266, data is further grouped and summarized by types of sales, and then by groups within these sales types. Within the country group, data is also broken down by region (state) and then grouped by type of sales, and then by groups within these categories. Using this structure, it is possible to match fields within the groups, such as the field for USA hardware sales 2218/2268 or CA hardware sales 2223/2273. In one embodiment, if a corresponding sub-field is not available in both reports, a zero will be inserted as the value for the sub-field in the case where that field is not available in the original report.

In one embodiment, the trend data is generated only for a specific group section of the report data. In FIG. 22, the consolidated data sets 2280 and 2290 both contain the data from multiple reports based on their time stamp and based on the values for a specific group. For example, in the consolidated data set showing the trend between Q1 2005 and Q1 2004 for Division A 2280 the group that is displayed is the USA summary. This data is placed in a table where the rows are identified based on the time stamp 2282. Similarly, in the consolidated data set 2290 that compares the USA product sales a specific group level is consolidated.

When a consolidated data set for trend data 2280 is constructed it maps the data from multiple report instances into the consolidated data set based on the logical structure in the original report instances. Although it contains data extracted from multiple reports combined in a logical manner, no calculations or processing in addition to augmenting the data with metadata occurs. The consolidated data set 2290 shows a consolidated data set that brings the values together from two report instances. The data sets that are used to produce this consolidated data set could alternatively be processed with the data differentiator module 1614 to create a differentiated data set.

Figure 23:
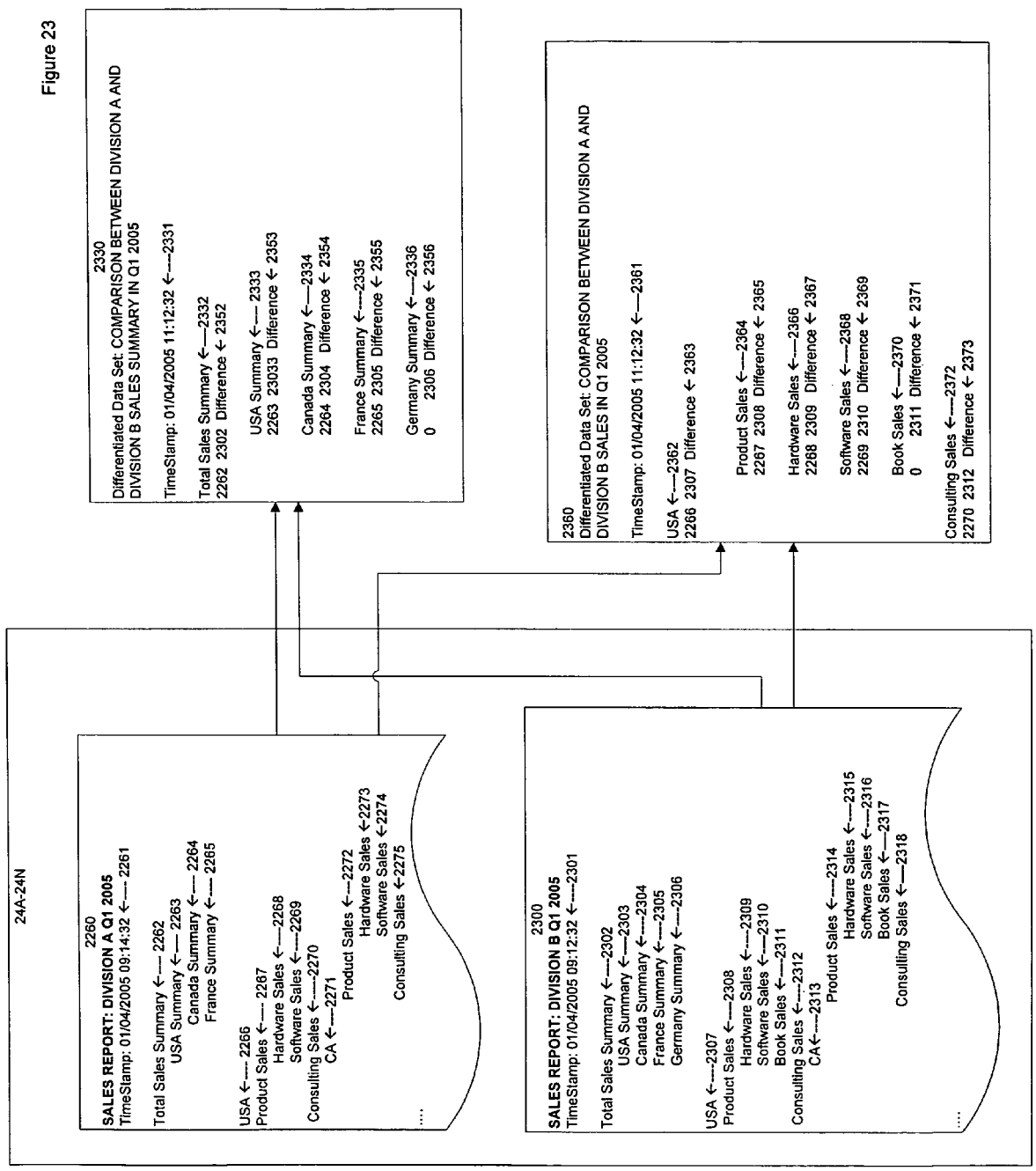
FIG. 23 illustrates specific reports to construct a differentiation data set.

FIG. 23 shows specific reports and illustrates the construction of a differentiated data set based on these reports. In this case the reports that are used to create the differentiated data set are for different subjects, but these reports could also be for the same subject at different points in time. The report structures are similar, which enables meaningful comparisons and a common data structure. In the case where a parallel field is not available in one report, the value of zero is used. For example, report 2300 contains a summary value for Germany 2306 and report 2260 does not contain a summary field for Germany. When these values are differentiated to create a new data set 2330, the Germany summary 2336 contains the zero as the value for report 2260 and the appropriate value 2306 for report 2300.

In one embodiment, when differentiated data sets are constructed they provide for a logical section of the report data based on the groups within the report. In this case, the differentiated data set 2330 contains data for the summary fields and the differentiated data set 2360 contains the data for the group USA. Based on this logic, the differentiated data set 2360 would not contain the data for states, (such as CA) as that would be generated as a separated differentiated data set.

The differentiated data sets 2330 and 2360 are shown as containing three values one from report 2260, one from report 2300, and a calculated value for the difference. The first two values are the ones provided to the data differentiator module 1614 and the third values (2352, 2353, 2354, 2355, 2356, 2363, 2365, 2367, 2369, 2371, 2373) are calculated by the data differentiator module and passed to the metadata augmenter 1612 in the differentiated data set.

Figure 24:
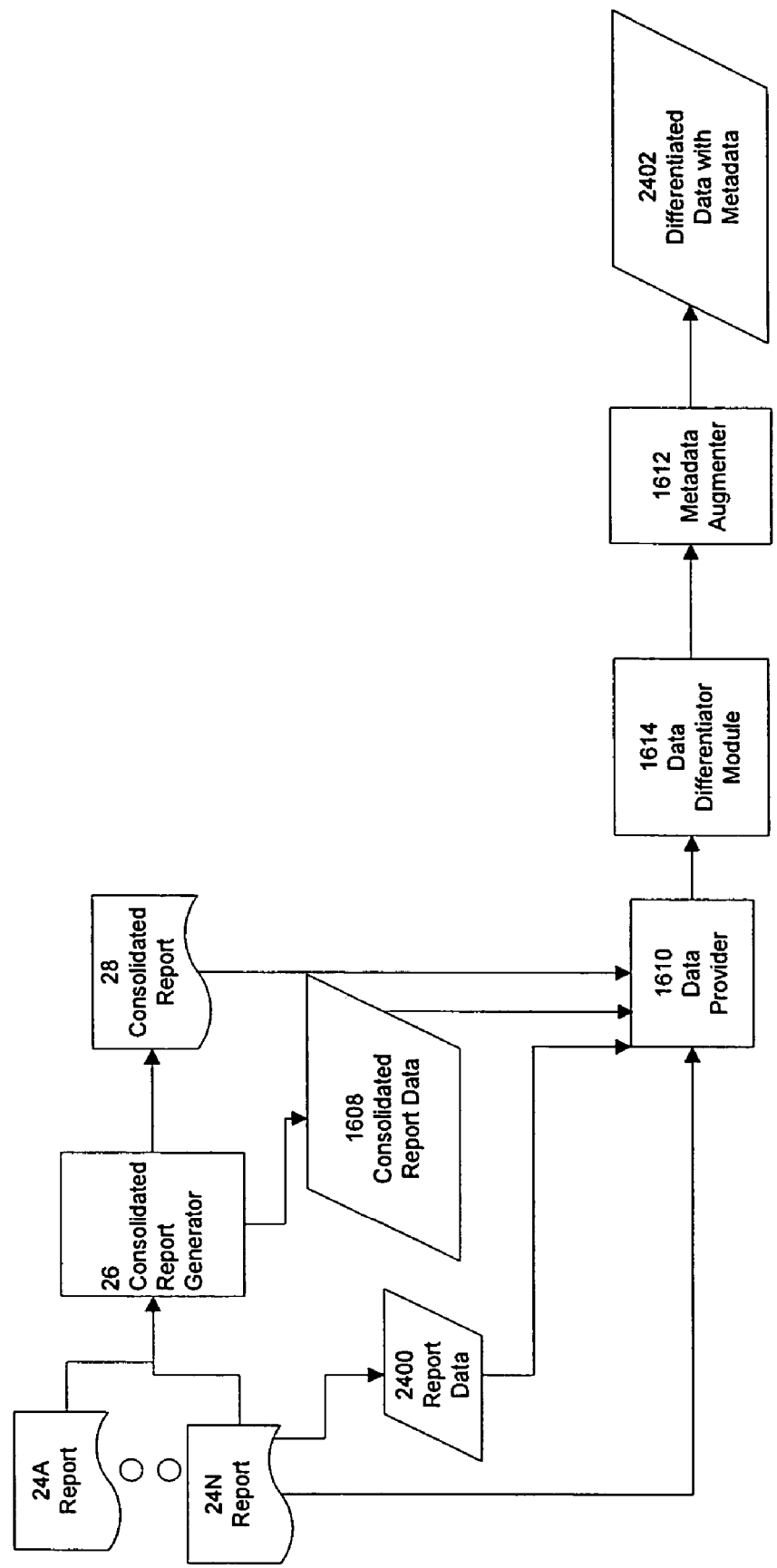
FIG. 24 illustrates a range of potential report based data sources being provided to a data differentiator module to generate differentiated data with metadata.

FIG. 24 illustrates workflow associated with the data differentiator module 1614. Through the data provider 1610, the data differentiator module can accept input types such as reports 24A-24N, report data 2400, consolidated reports 28, or consolidated data sets 1608. In each case, the data differentiator module 1614 receives two sets of data. This data can be of different input types that are based on report instance data. For example, one data set could be based on simple report data 2400 and the other data set could be based on a consolidated data set 1608. The data differentiator module processes the data sets to calculate the differences and this calculation may include additional calculations. The data differentiator module passes the new data set to the metadata augmenter 1612. The resulting differentiated data with metadata 2402 can be passed to another software application.

FIG. 25 illustrates a further embodiment of the system in which the consolidated data set is provided to other applications such as a report document 2500, alerting application 2502, or a performance management application 2506. Acting as a data provider the metadata augmenter 1612, provides the consolidated data to another application or document. The provided data includes the metadata that has been added to the data to provide information about the report and data source.

Different object architectures can be used to implement various consolidated report functionality. For example, consolidated reports can be programmed to run at a scheduled time. At the scheduled time, the new object inherits the superset of all instances of the parent. Security may also be implemented through various object architectures. For example, a user may be prohibited from generating a consolidated report unless the individual has access to the parent object.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer-readable medium, comprising a memory storing executable instructions processed by a computer to:
create a repository of individual reports by processing data within a database, wherein said executable instructions to create said repository of individual reports include executable instructions to create individual reports as time stamped instances of data within said database;
analyze a repository of individual reports to generate a consolidated data set, wherein said consolidated data set includes data from a plurality of said individual reports, wherein each individual report includes information structured in accordance with a report schema that specifies the form in which the information should be presented, the report schema specifying a first data group and a second data group positioned underneath the first data group to form a structure to facilitate the matching of a field within a data group of a first individual report with a field within a data group of a second individual report;
augment said consolidated data set with metadata selected from security information, data history and data validity, wherein said metadata includes information about the last presentation format of data within said individual reports; and
insert said consolidated data set and said metadata within an electronic document.

2. The computer-readable medium of claim 1, wherein said executable instructions to analyze said repository of individual reports to generate said consolidated data set include executable instructions to generate said consolidated data set based on corresponding data points from individual reports that contain different time stamps.

3. The computer-readable medium of claim 1, wherein said executable instructions to analyze include executable instructions to analyze at least one common attribute shared by individual reports within said repository.

4. The computer-readable medium of claim 1, wherein said metadata provides information supplying a data context.

5. The computer-readable medium of claim 1, wherein said metadata is extensible.

6. The computer-readable medium of claim 1, wherein said metadata provides information facilitating a link to an original individual report.

7. The computer-readable medium of claim 1, wherein said metadata provides information to coordinate a refresh request.

8. The computer-readable medium of claim 1 further comprising, executable instructions to facilitate copying of said consolidated data set from said electronic document to a secondary electronic document while maintaining said metadata.

9. A method of processing data on a computer, comprising:
creating a repository of individual reports by processing data within a database, wherein creating includes creating individual reports as time stamped instances of data within said database, wherein each individual report includes information structured in accordance with a report schema that specifies the form in which the information should be presented, the report schema specifying a first data group and a second data group positioned underneath the first data group to form a structure to facilitate the matching of a field within a data group of a first individual report with a field within a data group of a second individual report;
analyzing said repository of individual reports to generate a consolidated data set, wherein said consolidated data set includes data from a plurality of said individual reports;
augmenting said consolidated data set with metadata selected from security information, data history and data validity, wherein augmenting includes supplying information about the last presentation format of data within said individual reports; and inserting said consolidated data set and said metadata within an electronic document.

10. The method of claim 9, wherein analyzing includes generating said consolidated data set based on corresponding data points from individual reports that contain different time stamps.

11. The method of claim 9, wherein analyzing includes analyzing at least one common attribute shared by individual reports within said repository.

12. The method of claim 9, wherein augmenting includes supplying a data context.

13. The method of claim 9, wherein augmenting includes supplying extensible metadata.

14. The method of claim 9, wherein augmenting includes supplying metadata to facilitate a link to an original individual report.

15. The method of claim 9, wherein augmenting includes supplying metadata to coordinate a refresh request.

* * * * *